United States Patent
Withrow et al.

(10) Patent No.: US 10,614,302 B2
(45) Date of Patent: Apr. 7, 2020

(54) CONTROLLED AUTHENTICATION OF PHYSICAL OBJECTS

(71) Applicant: Alitheon, Inc., Redmond, WA (US)

(72) Inventors: Justin Lynn Withrow, Redmond, WA (US); David Justin Ross, Redmond, WA (US)

(73) Assignee: ALITHEON, INC., Bellevue, WA (US)

( * ) Notice: Subject to any disclaimer, the term of this patent is extended or adjusted under 35 U.S.C. 154(b) by 172 days.

(21) Appl. No.: 15/600,566

(22) Filed: May 19, 2017

(65) Prior Publication Data
US 2017/0344823 A1 Nov. 30, 2017

Related U.S. Application Data

(60) Provisional application No. 62/342,147, filed on May 26, 2016.

(51) Int. Cl.
  *G06K 9/00* (2006.01)
  *G06F 21/30* (2013.01)
  (Continued)

(52) U.S. Cl.
  CPC ......... *G06K 9/00463* (2013.01); *G06F 16/51* (2019.01); *G06F 16/56* (2019.01); *G06F 16/5838* (2019.01); *G06F 21/30* (2013.01); *G06K 9/00483* (2013.01); *G06K 9/00577* (2013.01)

(58) Field of Classification Search
  None
  See application file for complete search history.

(56) References Cited

U.S. PATENT DOCUMENTS

| 4,218,674 A | 8/1980 | Brosow |
| 4,423,415 A | 12/1983 | Goldman |

(Continued)

FOREIGN PATENT DOCUMENTS

| DE | 102006 005927 A1 | 8/2007 |
| EP | 759596 A2 | 2/1997 |

(Continued)

OTHER PUBLICATIONS

Clifton Smith; "Fireball: A Forensic Ballistic Imaging System"; Security Science, Edith Cowan University; IEEE; 1997.

(Continued)

*Primary Examiner* — Wei Wen Yang
(74) *Attorney, Agent, or Firm* — DLA Piper LLP (US)

(57) ABSTRACT

A physical object is scanned and a digital image of the object is generated from the scan. At least one subset of the image, known as an "authentication region" is selected. A plurality of feature vectors, arising from the physical structure of the object, are extracted from certain locations of interest within an authentication region and combined to generate a unique identifier or "digital fingerprint" for that object. Preferably, authentication regions for feature vector extraction are automatically selected by a software process. To identify or authenticate an object, a system may compare a digital fingerprint of an object to digital fingerprints previously stored in a database. Digital fingerprint data may specify a set of features (also termed "locations of interest") which may be referenced in the creation of a "fingerprint template" which is a template of certain locations of interest and/or attributes selected for authenticating a particular class of objects.

28 Claims, 17 Drawing Sheets

(51) Int. Cl.
    *G06F 16/51*    (2019.01)
    *G06F 16/56*    (2019.01)
    *G06F 16/583*   (2019.01)

(56) References Cited

U.S. PATENT DOCUMENTS

| | | | |
|---|---|---|---|
| 4,677,435 | A | 6/1987 | Causse D'Agraives |
| 4,921,107 | A | 5/1990 | Hofer |
| 5,031,223 | A | 7/1991 | Rosenbaum |
| 5,079,714 | A | 1/1992 | Manduley |
| 5,393,939 | A | 2/1995 | Nasuta, Jr. |
| 5,422,821 | A | 6/1995 | Allen |
| 5,514,863 | A | 5/1996 | Williams |
| 5,518,122 | A | 5/1996 | Tilles |
| 5,703,783 | A | 12/1997 | Allen et al. |
| 5,719,939 | A | 2/1998 | Tel |
| 5,734,568 | A | 3/1998 | Borgendale |
| 5,745,590 | A | 4/1998 | Pollard |
| 5,883,971 | A | 3/1999 | Bolle |
| 5,923,848 | A | 7/1999 | Goodhand |
| 5,974,150 | A | 10/1999 | Kaish |
| 6,246,794 | B1 | 6/2001 | Kageghiro |
| 6,292,709 | B1 | 9/2001 | Uhl |
| 6,327,373 | B1 | 12/2001 | Yura |
| 6,343,327 | B2 | 1/2002 | Daniels, Jr. |
| 6,360,001 | B1 | 3/2002 | Berger |
| 6,370,259 | B1 | 4/2002 | Hobson |
| 6,424,728 | B1 | 7/2002 | Ammar |
| 6,434,601 | B1 | 8/2002 | Rollins |
| 6,470,091 | B2 | 10/2002 | Koga |
| 6,539,098 | B1 | 3/2003 | Baker |
| 6,549,892 | B1 | 4/2003 | Sansone |
| 6,697,500 | B2 | 2/2004 | Woolston |
| 6,741,724 | B1 | 5/2004 | Bruce |
| 6,768,810 | B2 | 7/2004 | Emanuelsson |
| 6,778,703 | B1 | 8/2004 | Zlotnick |
| 6,805,926 | B2 | 10/2004 | Cote |
| 6,816,602 | B2 | 11/2004 | Coffelt |
| 6,829,369 | B2 | 12/2004 | Poulin |
| 6,985,926 | B1 | 1/2006 | Ferlauto |
| 7,016,532 | B2 | 3/2006 | Boncyk |
| 7,096,152 | B1 | 8/2006 | Ong |
| 7,121,458 | B2 | 10/2006 | Avant |
| 7,171,049 | B2 | 1/2007 | Snapp |
| 7,204,415 | B2 | 4/2007 | Payne |
| 7,212,949 | B2 | 5/2007 | Bachrach |
| 7,356,162 | B2 | 4/2008 | Caillon |
| 7,436,979 | B2 | 10/2008 | Bruce |
| 7,477,780 | B2 | 1/2009 | Boncyk |
| 7,518,080 | B2 | 4/2009 | Amato |
| 7,602,938 | B2 | 10/2009 | Proloski |
| 7,674,995 | B2 | 3/2010 | Desprez |
| 7,680,306 | B2 | 3/2010 | Boutant |
| 7,720,256 | B2 | 5/2010 | Desprez |
| 7,726,548 | B2 | 6/2010 | deLaVergne |
| 7,822,263 | B1 | 10/2010 | Proloski |
| 7,834,289 | B2 | 11/2010 | Orbke |
| 7,853,792 | B2 | 12/2010 | Cowburn |
| 8,022,832 | B2 | 9/2011 | Vogt |
| 8,108,309 | B2 | 1/2012 | Tan |
| 8,180,174 | B2 | 5/2012 | Di Venuto |
| 8,180,667 | B1 | 5/2012 | Baluja |
| 8,194,938 | B2 | 6/2012 | Wechsler |
| 8,428,772 | B2 | 4/2013 | Miette |
| 8,477,992 | B2 | 7/2013 | Paul |
| 8,520,888 | B2 | 8/2013 | Spitzig |
| 8,526,743 | B1 | 9/2013 | Campbell |
| 8,774,455 | B2 | 7/2014 | Elmenhurst |
| 9,031,329 | B1 | 5/2015 | Farid |
| 9,058,543 | B2 | 6/2015 | Campbell |
| 9,152,862 | B2 | 10/2015 | Ross |
| 2001/0010334 | A1 | 8/2001 | Park |
| 2001/0054031 | A1 | 12/2001 | Lee |
| 2002/0015515 | A1 | 2/2002 | Lichtermann |
| 2002/0168090 | A1 | 11/2002 | Bruce |
| 2003/0046103 | A1 | 3/2003 | Amato |
| 2003/0091724 | A1 | 5/2003 | Mizoguchi |
| 2003/0120677 | A1 | 6/2003 | Vernon |
| 2003/0179931 | A1 | 9/2003 | Sun |
| 2003/0182018 | A1 | 9/2003 | Snapp |
| 2003/0208298 | A1 | 11/2003 | Edmonds |
| 2004/0027630 | A1 | 2/2004 | Lizotte |
| 2004/0112962 | A1 | 6/2004 | Farrall |
| 2004/0218791 | A1 | 11/2004 | Jiang |
| 2004/0218801 | A1 | 11/2004 | Houle |
| 2004/0228514 | A1* | 11/2004 | Houle ............... G06K 9/00154 382/137 |
| 2005/0065719 | A1 | 3/2005 | Khan |
| 2005/0086256 | A1 | 4/2005 | Owens |
| 2005/0119786 | A1 | 6/2005 | Kadaba |
| 2005/0131576 | A1 | 6/2005 | DeLeo |
| 2005/0188213 | A1 | 8/2005 | Xu |
| 2005/0251285 | A1 | 11/2005 | Boyce |
| 2005/0257064 | A1 | 11/2005 | Boutant |
| 2006/0010503 | A1 | 1/2006 | Inoue |
| 2006/0083414 | A1 | 4/2006 | Neumann |
| 2006/0131518 | A1 | 6/2006 | Ross |
| 2006/0177104 | A1 | 8/2006 | Prokoski |
| 2006/0253406 | A1 | 11/2006 | Caillon |
| 2007/0085710 | A1 | 4/2007 | Bousquet |
| 2007/0094155 | A1 | 4/2007 | Dearing |
| 2007/0126578 | A1* | 6/2007 | Broussard ............ G06Q 10/087 340/572.1 |
| 2007/0263267 | A1 | 11/2007 | Ditt |
| 2007/0282900 | A1 | 12/2007 | Owens |
| 2008/0011841 | A1 | 1/2008 | Self |
| 2008/0130947 | A1 | 6/2008 | Ross |
| 2008/0219503 | A1 | 9/2008 | DiVenuto |
| 2008/0250483 | A1 | 10/2008 | Lee |
| 2008/0255758 | A1 | 10/2008 | Graham |
| 2008/0272585 | A1 | 11/2008 | Conard |
| 2008/0294474 | A1 | 11/2008 | Furka |
| 2009/0028379 | A1 | 1/2009 | Belanger |
| 2009/0057207 | A1 | 3/2009 | Orbke |
| 2009/0106042 | A1 | 4/2009 | Maytal |
| 2009/0154778 | A1 | 6/2009 | Lei |
| 2009/0157733 | A1 | 6/2009 | Kim |
| 2009/0245652 | A1 | 10/2009 | Bastos dos Santos |
| 2009/0271029 | A1 | 10/2009 | Doutre |
| 2009/0307005 | A1 | 12/2009 | O'Martin |
| 2010/0027834 | A1 | 2/2010 | Spitzig |
| 2010/0070527 | A1 | 3/2010 | Chen |
| 2010/0104200 | A1 | 4/2010 | Baras |
| 2010/0163612 | A1 | 7/2010 | Caillon |
| 2010/0166303 | A1 | 7/2010 | Rahimi |
| 2010/0174406 | A1 | 7/2010 | Miette |
| 2011/0026831 | A1 | 2/2011 | Perronnin |
| 2011/0091068 | A1 | 4/2011 | Stuck |
| 2011/0161117 | A1 | 6/2011 | Busque |
| 2011/0188709 | A1 | 8/2011 | Gupta |
| 2011/0194780 | A1 | 8/2011 | Li |
| 2011/0235920 | A1 | 9/2011 | Iwamoto |
| 2012/0042171 | A1 | 2/2012 | White |
| 2012/0130868 | A1 | 5/2012 | Loken |
| 2012/0250945 | A1 | 10/2012 | Peng |
| 2013/0277425 | A1 | 10/2013 | Sharma |
| 2013/0284803 | A1 | 10/2013 | Wood |
| 2014/0140570 | A1 | 5/2014 | Ross |
| 2014/0140571 | A1 | 5/2014 | Elmenhurst |
| 2014/0184843 | A1 | 7/2014 | Campbell |
| 2014/0270341 | A1 | 9/2014 | Elmenhurst |
| 2015/0067346 | A1 | 3/2015 | Ross |
| 2015/0078629 | A1 | 3/2015 | Gottemukkula |
| 2015/0086068 | A1 | 3/2015 | Mulhearn |
| 2015/0117701 | A1 | 4/2015 | Ross |
| 2016/0162734 | A1 | 6/2016 | Ross |
| 2016/0335520 | A1 | 11/2016 | Ross |
| 2017/0243230 | A1 | 8/2017 | Ross |
| 2017/0243231 | A1 | 8/2017 | Ross |
| 2017/0243232 | A1 | 8/2017 | Ross |
| 2017/0243233 | A1 | 8/2017 | Ross |

FOREIGN PATENT DOCUMENTS

| | | |
|---|---|---|
| EP | 1016548 A2 | 7/2000 |
| EP | 1719070 | 4/2006 |
| EP | 2195621 B1 | 6/2010 |
| EP | 2866193 A1 | 4/2015 |
| EP | 2869240 A2 | 5/2015 |
| EP | 2869241 A2 | 5/2015 |
| GB | 2097979 A | 11/1982 |
| JP | 61-234481 A | 10/1986 |
| WO | 2006/038114 A1 | 4/2006 |
| WO | 2007/031176 A1 | 3/2007 |
| WO | 2007/071788 A1 | 6/2007 |
| WO | 2007/090437 A1 | 8/2007 |
| WO | 2009/030853 A1 | 3/2009 |
| WO | 2012/145842 A1 | 11/2010 |
| WO | 2013/126221 A1 | 8/2013 |
| WO | 2015/004434 A1 | 1/2015 |

OTHER PUBLICATIONS

Huang, et al., "An Online Ballistics Imaging System for Firearm Identification"; 2010 2nd International Conference on Signal Processing Systems (ICSPS).

Leng, et al., "A Novel Binarization Algorithms for Ballistics Imaging Systems"; 2010 3rd International Congress on Image and Signal Processing (CISP2010).

Li; "Firearm Identification System Based on Ballistics Image Processing"; 2008 Congress on Image and Signal Processing.

NCOA Link at http://ribbs.usps.gov/ncoalink/ncoalink_print.htm; dated May 27, 2009; 3 pages.

Online NCOALink Processing Acknowledgement Form (PAF) Released by Lorton Data; http://us.generation-nt.com/online-ncoalink-processing-acknowledgement-form-paf-released-by-press-1567191.html; release dated Jun. 2, 2009; 1 page.

United States Postal Service Publication 28 "Postal Addressing Standards", dated Jul. 2008; text plus Appendix A only; 55 pages.

Farid, "Digital Image Forensics", Dartmouth CS 89/189, Sprint 2013; 199 pages.

United States Postal Service, "NCOALink Systems", http://www.usps.com/ncsc/addressservices/moveupdate/changeaddress.htm, website accessed Jun. 23, 2010, 2 pages.

Schwabe Williamson & Wyatt, PC, "Listing of Related Cases", Aug. 21, 2017; 2 pages.

* cited by examiner

FIG. 10

| Step 1 | | | | | | | | | | | | | | | | |
|---|---|---|---|---|---|---|---|---|---|---|---|---|---|---|---|---|
| 0 | 0 | 0 | 0 | 0 | 0 | | | | | | | | pixel location (x,y) | | | |
| 0 | 1 | 1 | 1 | 1 | 0 | | 1 | 1 | 1 | 1 | | | pixel value (0 or 1) | | | |
| 0 | 1 | 0 | 0 | 1 | 0 | Extract | 1 | | | 1 | Store as | | | | | |
| 0 | 1 | 0 | 0 | 1 | 0 | Features | 1 | | | 1 | Feature | [(1,1,1), (1,2,1), (1,3,1)...] | | | | |
| 0 | 1 | 1 | 1 | 1 | 0 | | 1 | 1 | 1 | 1 | Vector | | | | | |
| 0 | 0 | 0 | 0 | 0 | 0 | | | | | | | | | | | |
| | Original Image | | | | | | Extracted Features | | | | | | | | | |

FIG. 11

| Step 2 | | | | | | | | | | | | | | | | |
|---|---|---|---|---|---|---|---|---|---|---|---|---|---|---|---|---|
| 0 | 0 | 0 | 0 | 0 | 0 | | | | | | | | pixel location (x,y) | | | |
| 0 | 1 | 1 | 1 | 1 | 0 | | 1 | 1 | 1 | 1 | | | pixel value (0 or 1) | | | |
| 0 | 1 | 0 | 0 | 1 | 0 | Extract | 1 | | | 1 | Store as | | | | | |
| 0 | 1 | 0 | 0 | 1 | 0 | Features | 1 | | | 1 | Feature | [(1,1,1), (1,2,1), (1,3,1)...] | | | | |
| 0 | 1 | 1 | 1 | 1 | 0 | | 1 | 1 | 1 | 1 | Vector | | | | | |
| 0 | 0 | 0 | 0 | 0 | 0 | | | | | | | | | | | |
| Comparison Image | | | | | | | Extracted Features | | | | | | | | | |

FIG. 12

| Step 3 | | | | | |
|---|---|---|---|---|---|
| | | Compare | | | |
| [(1,1,1), (1,2,1), (1,3,1)...] | | Feature | [(1,1,1), (1,2,1), (1,3,1)...] | = | Objects |
| | | Vectors | | | Match |
| Original Features | | | Comparison Features | | |

FIG. 15A
FIG. 15B
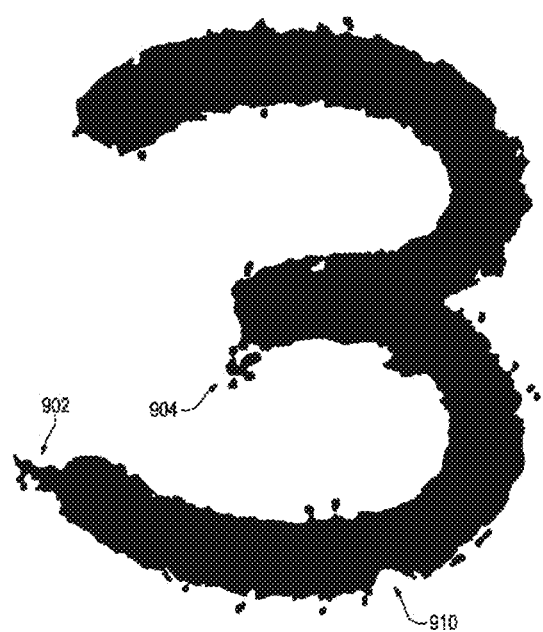

FIG. 16A
FIG. 16B
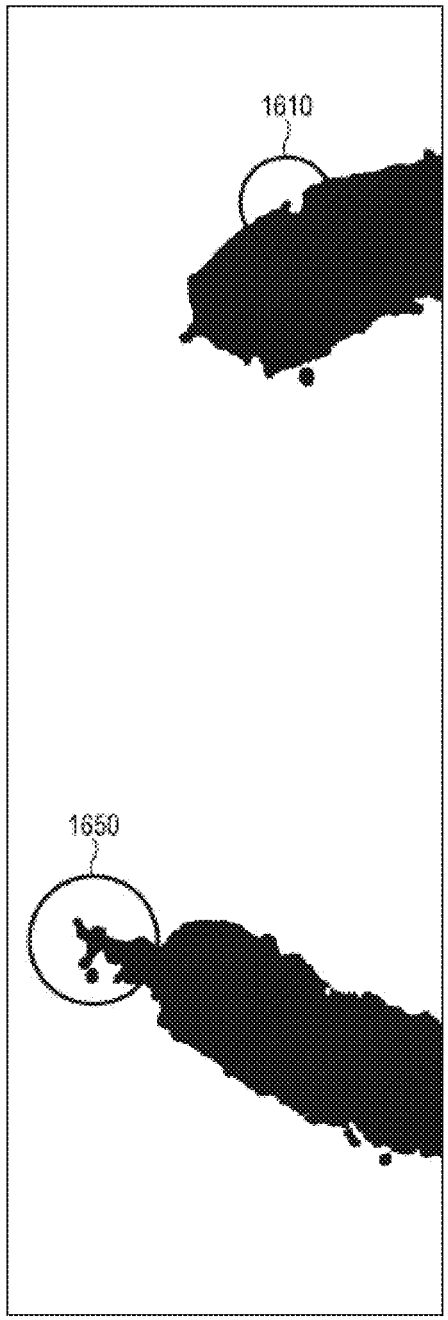
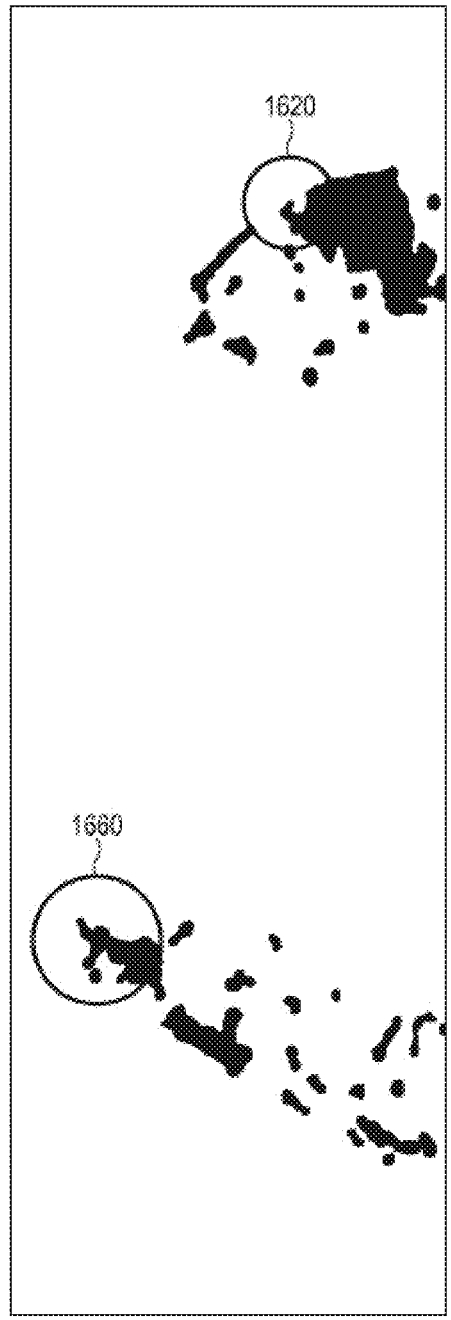

ial application No. 62/342,147 filed May 26, 2016,
CONTROLLED AUTHENTICATION OF PHYSICAL OBJECTS

PRIORITY CLAIM

This application is a non-provisional of, and claims priority pursuant to 35 U.S.C. § 119(e) (2012) to, U.S. provisional application No. 62/342,147 filed May 26, 2016, hereby incorporated by reference as though fully set forth.

COPYRIGHT NOTICE

COPYRIGHT ©2016-2017 Alitheon, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 C.F.R. § 1.71(d) (2017).

TECHNICAL FIELD

The present disclosure relates to the field of centralized databases storing digital fingerprints of objects that enable enhanced security, rapid searching, and high reliability. Other aspects include methods and apparatus to identify, track, and authenticate physical objects utilizing a suitable database.

BACKGROUND

Many different approaches are known to uniquely identify and authenticate objects, including labeling and tagging strategies using serial numbers, bar codes, holographic labels, RFID tags, and hidden patterns using security inks or special fibers. All of these methods can be duplicated, and many add substantial costs to the production of the goods sought to be protected. Physical labels and tags are also themselves at risk of being lost, stolen, or counterfeited.

Other known techniques for object identification or authentication rely on the comparison of bitmaps of images of objects. Referring now to FIG. 8, an image of an object is captured and stored for reference. The whole image is stored, although it may be compressed for efficiency. When a new object is encountered, an image is captured of the new object and compared to the original image, using XOR or similar algorithms. If there are no (or only statistically insignificant) differences, the images are declared a match and the object is authenticated. Further, FFT or similar transforms may be used to generate a "digital signature" of the image that can be used for comparison. See FIG. 9. However, as in the previous case the same method is used, i.e. the resultant bitmapped image is compared with another bitmapped image, and if the pixels match the object is authenticated. Such methods are disclosed in U.S. Pat. No. 7,680,306 to Boutant, et al. Bitmapped techniques have limitations that render them unusable in many real world applications, such limitations consisting of, for example, inefficiencies due to file sizes, difficulties presented by variable lighting and orientation of images, and the inability to authenticate worn, damaged, or otherwise altered objects.

SUMMARY OF THE PRESENT DISCLOSURE

The following is a summary of the present disclosure in order to provide a basic understanding of some features and context. This summary is not intended to identify key/critical elements of the disclosure or to delineate the scope of the disclosure. Its sole purpose is to present some concepts of the present disclosure in a simplified form as a prelude to a more detailed description that is presented later.

There are many known approaches to establishing or reestablishing the authenticity of an object, including secure supply chains, expert assessment, and counterfeit detection. What is lacking, however, and is provided by the current disclosure, is the ability to perform controlled authentications based on the use of digital fingerprints and fingerprint templates for a variety of counterfeiting, conformity, and non-conformity assessments.

In an embodiment, at least a portion of a physical object is scanned and a digital image of the object is generated from the scan. At least one subset of the image, known as an "authentication region" is selected. A plurality of feature vectors, arising from the physical structure of an object, are extracted from certain locations of interest within an authentication region and combined to generate a unique identifier or "digital fingerprint" for that object. The process of extracting feature vectors from locations of interest may be referred to as a "feature extraction." The digital fingerprint may be registered in a database.

In a preferred embodiment, authentication regions for feature vector extraction are automatically selected by a software process. The software process preferably selects a large number of authentication regions for purposes of digital fingerprinting. An authentication region may be of interest because of a relatively high level of content. Content may comprise a gradient or vector, including a change in value and/or direction.

In a preferred embodiment, each region of interest is identified, for instance, as a circle by centroid location and radius. Within each circular region of interest, software may extract one or more fingerprint feature that defines relevant shapes within a corresponding circular location of an image. Each fingerprint feature may be stored as a feature vector as illustrated below. A feature vector preferably is an array of integer or floating point values describing a location of interest.

In order to authenticate an object, a suitable system may compare a digital fingerprint of an object to digital fingerprints previously stored in a database, and, based on such a comparison, determine whether the object has been registered before, and, is thus authentic. Digital fingerprint data may specify a set of features (also termed "locations of interest") which may be referenced in the creation of a "fingerprint template" which is a template of certain locations of interest and/or attributes selected for authenticating a particular class of objects. A fingerprint template may, for example, identify the coordinates and shape of particular features. A fingerprint template may in some instances be referred to as a feature template and the terms should be deemed equivalent. A key advantage of the feature-based method is that when an object is worn from handling or use, a feature-based system may still identify the object as authentic, which may be impossible to accomplish with the bitmapped approach.

Another aspect of the present disclosure relates to detecting counterfeit or altered objects, for example, a forged driver's license or passport. In the case of some objects, such as forgeries, there may be no original or source digital fingerprint available for comparison or matching. In such cases—or in any cases where object comparisons beyond original digital fingerprints are desired—an object may, for instance, be compared to digital fingerprints of known artifacts of counterfeit or altered objects. In one example, a large number of counterfeit New York State driver's licenses might be obtained by law enforcement officials in a raid or the like. Digital images of forged documents may be acquired and analyzed to generate digital fingerprints, as described in more detail below. Feature vectors of typical features that occur in the counterfeit licenses may be collected and stored in a database. Such features may include, for example, sharp, non-bleeding edges where a photograph has been replaced or torn paper fibers where an erasure occurred. The stored features from counterfeit licenses may be analyzed and stored as a reference set of fraudulent methods which may be compared to digital fingerprints of other licenses in an effort to detect forged licenses. In some embodiments, a count of fraud indicator matches may be compared to an empirical threshold to determine and quantify a confidence that a certain document is forged, or not.

Further, the fingerprinting approach described below can be used to determine how an object conforms to a predetermined specification, such as the degree to which a manufactured object meets its manufactured specifications. Applications of the system include but are not limited to object authentication, anti-counterfeiting, determining the provenance of an object, and compliance with predetermined object specifications.

Additional features of this disclosure include: Centralized databases storing digital fingerprints of objects which enable enhanced security, rapid searching, and high reliability. According to one method, a part of the induction/authentication process is done remote from a facility intended for this purpose. "In field" induction of an object may be conducted at almost any location using systems of the type described below. The term "induction" is used in the sense of inducting an object (or set of objects) into a secure database system; that is, creating and storing in the database system a special set of fingerprint data or digital fingerprints that are unique to the object. Induction may be done by a person, such as a technician, or it may be automated. Induction may be done clandestinely, so that the possessor of the object is not made aware of the induction. Other parts of an induction/authentication process may be done without the knowledge of the then-current possessors of the objects. In particular, when the induction and/or authentication are not part of the current possessors' normal processes. The term "authentication" is used here to include tracking an object, with or without regard to its "genuineness" or provenance.

Additional aspects and advantages of the present disclosure will be apparent from the following detailed description of preferred embodiments, which proceeds with reference to the accompanying drawings.

BRIEF DESCRIPTION OF THE DRAWINGS

FIG. 10 is a simple illustration of fingerprint feature extraction from an original digital image.

FIG. 11 is a simple illustration of fingerprint feature extraction from a comparison or candidate image.

FIG. 12 is a simple illustration of fingerprint feature comparison for identifying or authenticating an object.

FIG. 15A shows the same dollar bill image as in FIG. 13A, juxtaposed with FIG. 15B for comparison.

FIG. 15B shows an image of the numeral "3" that has been damaged or degraded.

FIG. 16A shows detail of two fingerprint feature locations on the numeral 3.

FIG. 16B shows detail of the damaged bill with the corresponding fingerprint feature locations called out for comparison.

DETAILED DESCRIPTION OF PREFERRED EMBODIMENTS

Figure 1:
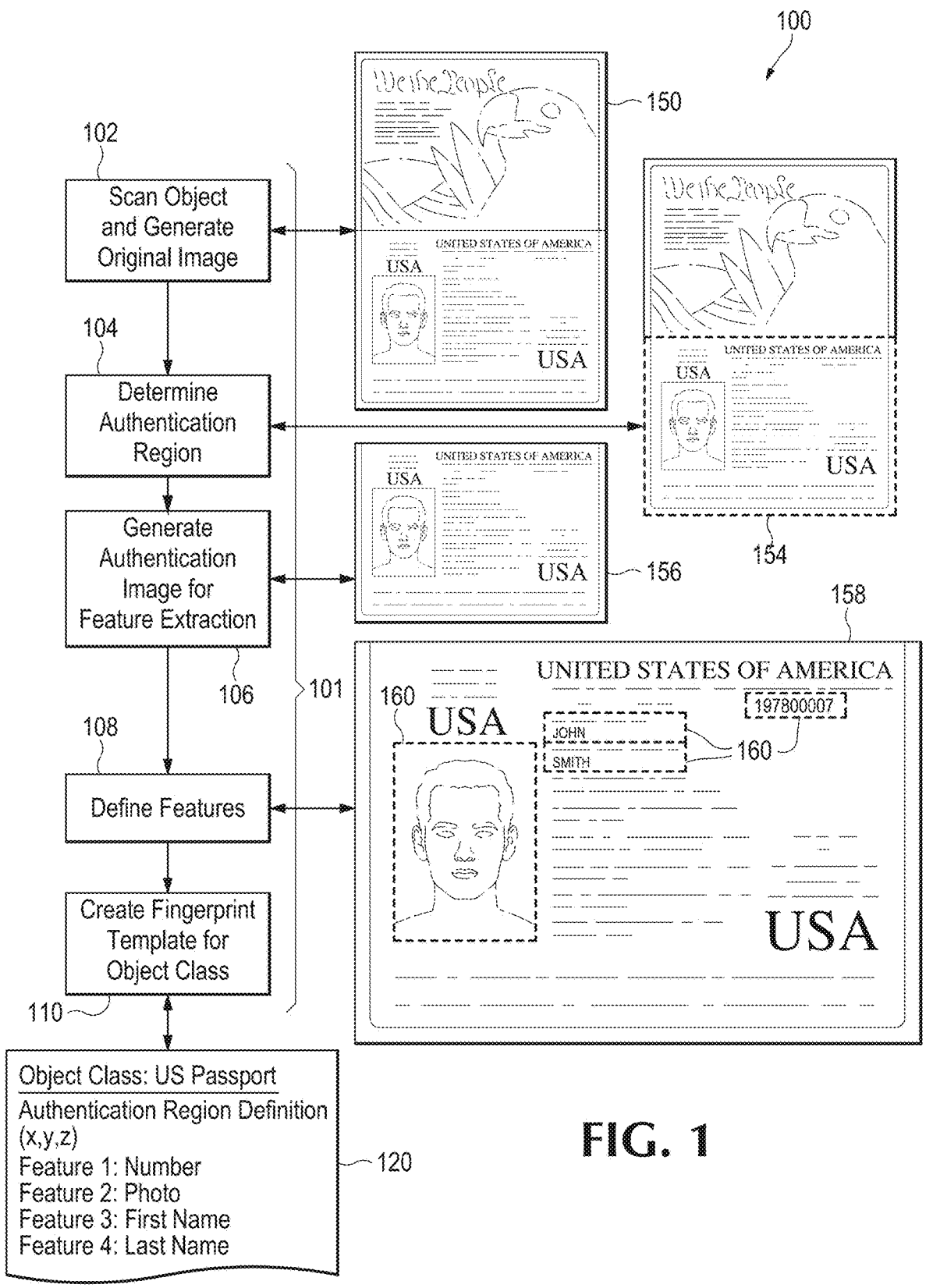
FIG. 1 is an example of an authentication region and fingerprint template definition for a U.S. passport.

The methods described in this disclosure enable the identification of an object without the need for attaching or associating physical tags or materials with the object. A system does this by creating a unique digital signature for the object, which is referred to as a digital fingerprint. Digital fingerprinting utilizes the structure of the object, including random and deliberate features created during the manufacturing or use of the object, to generate a unique digital signature for that object similar to the way in which a human fingerprint references the friction ridges on a finger. Also, like a human fingerprint, the digital fingerprint can be stored and retrieved to identify objects when they are encountered at a later date.

Eliminating the need to add tags or any physical modifications to the object offers a number of advantages to manufacturers, distributors, sellers, and owners of goods.

Forgoing the addition of physical identifiers reduces the cost of manufacturing and is more secure than physical tagging. Moreover, physical identifiers can be lost, modified, stolen, duplicated, or counterfeited whereas digital fingerprints cannot.

Unlike prior art approaches that simply utilize a comparison of pixels, a system in accordance with the present disclosure utilizes the extraction of features to identify and authenticate objects. Feature extraction enables us to take a large amount of information and reduce it to a smaller set of data points that can be processed more efficiently. For example, a large digital image that contains tens of thousands of pixels may be reduced to just a few locations of interest that can be used to identify an object. This reduced set of data is called a digital fingerprint. This digital fingerprint contains a set of fingerprint features or locations of interest which are stored as feature vectors. Feature vectors make image processing more efficient and reduce storage requirements as the entire image need not be stored in the database, only the feature vectors need to be stored. Examples of feature extraction algorithms include but are not limited to edge detection, corner detection, blob detection, wavelet features, Gabor, gradient and steerable output filter histograms, scale-invariant feature transformation, active contours, shape contexts, and parameterized shapes.

While the most common applications of our system may be in the authentication of manufactured goods and documents, the system is designed to be applicable to any object that can be identified, characterized, quality tested, or authenticated with a digital fingerprint. These include but are not limited to mail pieces, parcels, art, coins, currency, precious metals, gems, jewelry, apparel, mechanical parts, consumer goods, integrated circuits, firearms, pharmaceuticals, and food and beverages. Here the term "system" is used in a broad sense, including the methods of the present disclosure as well as apparatus arranged to implement such methods.

Scanning

In an embodiment, an object is scanned and identified either at initial manufacture or at the time of first contact with the system. This point of identification is preferably done when the object is either in the possession of its manufacturer, or has been transferred by secure means to the current holder so that its legitimacy at point of identification is adequately established. When such a process is impossible, as in the example of artworks or old coins, the object may be fingerprinted after the object is authenticated by an expert while its provenance is still secure.

In this application, the term "scan" is used in the broadest sense, referring to any and all means of capturing an image or set of images, which may be in digital form or transformed into digital form. Images may, for example, be two dimensional, three dimensional, or in the form of a video. Thus a "scan" may refer to an image (or digital data that defines an image) captured by a scanner, a camera, a specially-adapted sensor array (such as CCD array), a microscope, a smartphone camera, a video camera, an x-ray machine, a sonar, an ultrasound machine, a microphone (or other instruments for converting sound waves into electrical energy variations), etc. Broadly, any device that can sense and capture either electromagnetic radiation or mechanical wave that has traveled through an object or reflected off an object or any other means to capture surface or internal structure of an object is a candidate to create a "scan" of the object. Various means to extract "fingerprints" or features from an object may be used; for example, through sound, physical structure, chemical composition, or many others. The remainder of this application will use terms like "image" but when doing so, the broader uses of this technology should be implied. In other words, alternative means to extract "fingerprints" or features from an object should be considered equivalents within the scope of this disclosure.

Authentication Regions

Because digital fingerprinting works with many different types of objects, it may be helpful to define what regions of digital images of objects are to be used for the extraction of features for authentication purposes. The chosen regions may vary for different classes of objects. In some embodiments a chosen region may be the image of the entire object; in other embodiments chosen regions may be one or more sub-regions of the image of the object.

For instance, in the case of a photograph, a digital image of the entire photograph may be chosen for feature extraction. Each photograph is different, and there may be unique feature information anywhere in a photograph. In such a case, the authentication region may be the entire photograph.

In some embodiments, multiple regions may be used for fingerprinting. In some examples, there may be several regions where significant variations take place among different similar objects that need to be distinguished while, in the same objects, there may be regions of little significance. In other examples, a template (see FIG. 1) may be used to define regions of interest, including elimination of regions of little interest.

In one embodiment, an object, such as a bank note, may be deemed authenticated if a few small arbitrary regions scattered across the surface are fingerprinted, possibly combined with one or more recognitions of, for example, the contents of a region signifying the value of the bank note or one containing the bank note serial number. In such examples, the digital fingerprints of any region (along with sufficient additional information to determine the bank note value and its purported identity) may be considered sufficient to establish the authenticity of the bill. In some embodiments, multiple fingerprinted regions may be referenced in cases where one or more region may be absent from an object (through, for example, tearing) when, for example, a bank note is presented for authentication. In other embodiments, however, all regions of an object may need to be authenticated to ensure an object is both authentic and has not been altered.

In some cases, however, specific regions of an object may need to be authenticated to ensure the object is both authentic and has not been altered. A passport provides an example. In the case of a passport, the features chosen for authentication may be extracted from regions containing specific identification information such as the passport number, the recipient name, the recipient photo, etc. as illustrated in FIG. 1. In some examples, a user may define a fingerprint template specifying the regions whose alteration from the original would invalidate the passport, such as the photo, identifying personal data, or other regions considered important by the user.

FIG. 1 illustrates one example of an authentication region and a fingerprint template definition for a U.S. passport. In this figure, brace 101 refers to a simplified flow diagram of a process as follows: At process block 102, an object is scanned to generate an "original image", that is, a digital image file or a digital data file in any suitable format that is herein simply referred to as an "image". The original image is illustrated as the data page spread of a U.S. passport book, at block 150.

Next, the system processes the image data to determine an authentication region. In this example, the authentication region is the biographic data page of the U.S. Passport, located in the lower portion of image 150, identified by dashed box 154. Next, the process generates an authentication image for feature extraction, block 106. The authentication image is illustrated at reference 156. Next, at block 108, the process defines one or more locations of interest for feature vector extraction. The locations of interest in this example are, as shown in image 158 by dashed boxes 160, the surname, the given name, the passport number, and the passport photo.

Finally, at block 110, the process 100 comprises creating a fingerprint template 120. In this example, template 120 identifies an object class (U.S. Passport), defines an authentication region (for example, by X-Y coordinates), and lists one or more locations of interest within that authentication region. In this instance, the list comprises passport number, photo, first name, and last name.

In some embodiments, an ability to define and store authentication regions for classes of objects may offer benefits to a user. In some embodiments, it may be preferable to scan limited regions of objects than to scan entire objects. For instance, in the case of an article of designer clothing, scanning a clothing label may be preferable to scanning an entire garment. Further, defining such regions may enable detection of a partial alteration of the object.

Once an authentication region is defined, specific applications may be created for different markets or classes of objects that may assist users in locating and scanning suitable authentication regions. In some embodiments, for example when utilizing a mobile device, a location box and crosshairs may automatically appear in the viewfinder of a smartphone camera application to assist a user in centering the camera on an authentication region. The application may then automatically lock onto a region and complete a scan while the device is focused on an appropriate area.

In some embodiments, objects may have permanent labels or other identifying information attached to them. In addition to the objects themselves, these attachments may also be referenced as locations of interest for digital fingerprinting, particularly where the label or other identifying information becomes part of the object. In one example, a permanent label may be used as an authentication region for the object to which it is affixed. In another example, a label may be used in conjunction with the object itself to create a fingerprint of multiple authentication regions referencing both a label and the substrate to which the label is affixed.

In one example, wine may be put into a glass bottle and a label affixed to the bottle. Since it is possible a label may be removed and re-applied elsewhere, merely using the label itself as the authentication region may not be sufficient. In this case the authentication region may be defined so as to include both the label and the substrate the label is attached to—in this case some portion of the glass bottle. This "label and substrate" approach may be useful in defining authentication regions for many types of objects, such as various types of goods and associated packaging. In other instances, authentication may reveal changes in the relative positions of some authentication regions such as in cases where a label has been moved from its original position, which may be an indication of tampering or counterfeiting. If an object has "tamper-proof" packaging, this may also be included in the authentication region.

In some cases, multiple authentication regions may be selected for feature extractions. For example, in one embodiment, features may be extracted from two different parts of a firearm. Both features may match the original firearm but since it is possible that both parts may have been removed from the original firearm and affixed to a weapon of different quality, it may also be useful to determine whether the relative positions of the features have changed. In other words it may be helpful to determine that the distance (or other characteristics) between Part A's authentication region and Part B's authentication region remains consistent with the original feature extraction. If the positions of Parts A and B are found to be consistent to the relative positions of the original authentication regions, the firearm may be authenticated. Specifications of this type may be stored with or as part of a digital fingerprint of an object.

Once a digital fingerprint of an object is acquired, a characterization of the object and corresponding fingerprint may be recorded in a database. For example, in some embodiments, a fingerprint may comprise one or more feature vectors. In some applications, the database may be secure. In some embodiments, a unique identifier or ID may be assigned to an object, for example in cases where an ID may be a convenient index in an application. However, an ID is not required since a digital fingerprint itself may serve as a key for searching a database. In other words, by identifying an object by the unique features and characteristics of the object itself, arbitrary identifiers, labels, tags, etc. are rendered unnecessary.

Fingerprint Template Definition

In an embodiment, when a new type or class of object is being scanned into a system for the first time, the system can create a fingerprint template (as shown in FIG. 1) that can be used to control subsequent authentication operations for that class of objects. This template may be created either automatically by the system or by a human-assisted process.

A fingerprint template is not required for the system to authenticate an object, as the system can automatically extract features and create a digital fingerprint of an object without it. However, the presence of a template may optimize the authentication process and add additional functionality to the system.

TABLE 1

Example Fingerprint Template.

CLASS:
[Description of the object]
United States Passport
AUTHENTICATION REGION:
[Description of the authentication regions for the object]
Region 1: (x1, y1, z1), (x2, y2, z2)
.
.
.
Region n
REGION MATCH LIST
[List of the regions that are required to match to identify an object]
Region List: 1 . . . n
FEATURES:
[Key features of the object]
Feature 1: Passport Number
Feature 2: Photo
Feature 3: First Name
Feature 4: Last Name
.
.
.
Feature n
METHODS:
[Programs that can be run on features of an object]

TABLE 1-continued

Example Fingerprint Template.

Feature 2:
Photo Method 1: [checkphoto.exe] Check for uneven edges indicating photo substitution
.
.
.
Method n
Feature n
Method n
ADDITIONAL DATA
[Additional data associated with the object]
Data 1: example data
.
.
.
Data n The uses of the fingerprint template include but are not limited to determining the regions of interest on an object, the methods of extracting fingerprinting and other information from those regions of interest, and methods for comparing such features at different points in time. The name "fingerprint template" is not important; other data with similar functionality (but a different name) should be considered equivalent.

In an embodiment, four different but related uses for this technology are particularly in view in the present disclosure. These are illustrative but are not intended to be limiting of the scope of the disclosure. These applications may be classified broadly as (1) authentication of a previously scanned original, (2) detection of alteration of a previously scanned original, (3) detection of a counterfeit object without benefit of an original, and (4) assessing the degree to which an object conforms with a predetermined specification, such as a manufacturing specification.

In example (1), an object is fingerprinted preferably during the creation process (or at any time when its provenance may be sufficiently ascertained) or at a point where an expert has determined its authenticity. Subsequently, the object is later re-fingerprinted, and the two sets of fingerprints are compared to establish authenticity of the object. The fingerprints may be generated by extracting a single fingerprint from the entire object or by extracting multiple sets of features from multiple authentication regions. Fingerprinting may also involve reading or otherwise detecting a name, number, or other identifying characteristics of the object using optical character recognition or other means which may be used to expedite or facilitate a comparison with other fingerprints. For instance, in cases where manufacturing (or other object) databases use serial numbers or other readable identifiers, such identifiers may be utilized to directly access the database record for the object and compare its digital fingerprint to the original that was previously stored, rather than searching an entire digital fingerprinting database for a match.

In case (2), a fingerprinted object is compared, region by region, with a digital fingerprint of an original object to detect low or nonexistent matching of the fingerprint features from those regions. While case (1) is designed to determine whether the original object is now present, case (2) is designed to detect whether the original object has been altered and, if so, how it has been altered. In some embodiments, authentication regions having poor or no matching fingerprint features will be presumed to have been altered.

In case (3), an object may not have been fingerprinted while its provenance was sufficiently ascertainable. One example would be bills or passports created prior to initiating the use of a digital fingerprinting system. In such examples, digital fingerprints of certain regions of interest on an object may be compared with digital fingerprints from known, or suspected, counterfeit objects or with both those and fingerprints of properly authenticated objects. In one example, a photograph may be spuriously added to a passport and, as an artifact of the counterfeiting, the edge of the added photo may tend to be sharper than an edge of an original, unaltered, photograph. In such a case, fingerprint characteristics of known authentic passports and those of passports that are known (or suspected to) have been altered by changing a photograph may be compared with the passport being inspected to estimate whether the passport exhibits indications of alteration.

Figure 6:
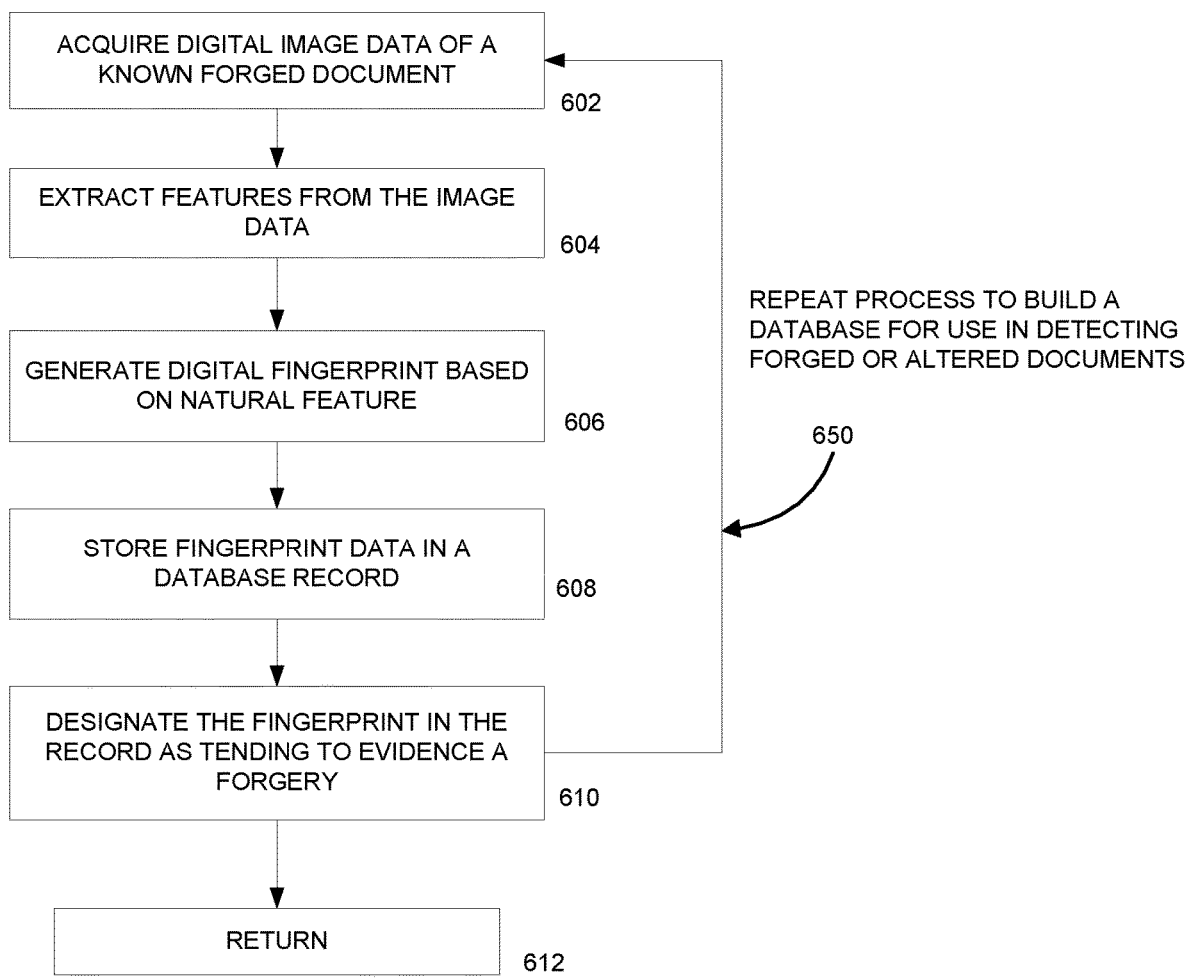
FIG. 6 is a simplified flow diagram illustrating a method for building a database for use in detecting forged or altered documents.

FIG. 6 is a simplified flow diagram of a process 600 for building a database for use in detecting counterfeit or suspected counterfeit (forged or altered) objects, herein a document. At process block 602, digital image data is acquired of a known or suspected forged or altered document. Next, features are extracted from the image data at block 604. Continuing, at block 606, a digital fingerprint is created based on the extracted features.

The digital fingerprint data is stored in a database record, block 608. Further, the record (digital fingerprint) is designated in the database as having features tending to evidence of a known or suspected forgery, block 610. The basic process may be repeated, loop 650, to acquire more images, and more features, to build the database.

In case (4), the question of authenticity or alteration is not at issue. Instead, the fingerprinting process is used to assess how an object conforms to a predetermined specification, such as a manufacturing specification. In such embodiments, the comparison of fingerprint features of a target object is made with reference to certain predetermined features of a reference object, preferably an ideal reference object. The reference object may exist as a physical example or may be a programmatic prescription. In the case of programmatically prescribed fingerprint features the fingerprint features will be generated manually or by a program rather than by scanning an original object.

A fingerprint template may contain a variety of information related to a class of objects. In an embodiment, a fingerprint template preferably includes one or more authentication regions for a class of objects—which authentication regions are utilized for matching—and a list of key features that are preferably used in authenticating an object of that class.

In some embodiments, a fingerprint template may define methods for examining an object for signs of modification or counterfeiting. For instance, every time a passport is scanned by a system, a program may be run to examine the passport for signs of alteration. If the passport was fingerprinted at an earlier point in time, for example at creation, the fingerprints previously extracted from one or more regions may be compared to fingerprints from corresponding regions at the time the passport is presented for authentication. If the passport was not fingerprinted at creation, the fingerprint template may be used to examine the passport for counterfeiting artifacts, such as sharp or non-bleeding edges that may indicate that a photograph has been replaced or torn paper fibers that may indicate where an erasure has occurred. In addition to the examples discussed above, the fingerprint template is designed to be extensible and may store any additional data that is related to the object.

Digital Fingerprint Generation

In an embodiment, once an object has been scanned and at least one authentication region has been identified, the digital image, which will be used to create the unique digital fingerprint for the object, is generated. The digital image (or set of images) provides the source information for the feature extraction process.

In the present disclosure, a digital fingerprinting feature is defined as a feature or a location of interest in an object, which feature is inherent to the object itself. In some embodiments, features preferably are a result of a manufacturing process, other external processes, or of any random, pseudo-random, or deliberate process or force, such as use. To give one example, gemstones have a crystal pattern which provides an identifying feature set. Every gemstone is unique and every gem stone has a series of random flaws in its crystal structure. This pattern of random flaws may be used for the extraction of feature vectors for identification and authentication.

In the present disclosure, a "feature" is not necessarily concerned with reading or recognizing meaningful content, for example by using methods like optical character recognition. A digital fingerprint of an object may capture both features of the object and features of any identifiers that are affixed or attached to the object. Feature vectors extracted from authentication regions located on an affixed identifier are based on the substances of which the identifier is physically comprised rather than the information (preferably alphanumeric) that is intended to be communicated by the identifier. For instance, in the case of a wine bottle, features may be captured from the bottle and from a label affixed to the bottle. If the label includes a standard UPC bar code, the paper of the label and the ink pattern of the bar code may be used to extract a feature vector without reading the alphanumeric information reflected by the bar code. An identifier, such as a UPC bar code print consisting of lines and numbers, has no greater significance in the generation and use of a feature vector than a set of randomly printed lines and numbers.

Although reading identifier information is not necessary for digital fingerprinting, in some embodiments, where a user desires to capture or store identifier information (such as a name, serial number, or a bar code) in an association with an object, the system may allow the user to capture such information and store it in the digital fingerprint. Identifier information may, for example, be read and stored by utilizing techniques such as optical character recognition, and may be used to facilitate digital fingerprint comparisons. In some cases, serial numbers may be used as the primary index into a database that may also contain digital fingerprints. There may be practical reasons for referencing serial numbers in relations to digital fingerprints. In one example, a user is seeking determine whether a bank note is a match with a particular original. In this case, the user may be able to expedite the comparison by referencing the bank note serial number as an index into the digital fingerprinting database rather than iterating through a large quantity of fingerprints. In these types of cases, the index recognition may speed up the comparison process but it is not essential to it.

Once a suitable digital fingerprint of an object is generated the digital fingerprint may be stored or registered in a database. For example, in some embodiments, the digital fingerprint may comprise one or more fingerprint features which are stored as feature vectors. The database should preferably be secure. In some embodiments, a unique identifier, such as a serial number, may also be assigned to an object to serve, for example, as a convenient index. However, assigning a unique identifier is not essential as a digital fingerprint may itself serve as a key for searching a database independent of any addition of a unique identifier. In other words, since a digital fingerprint of an object identifies the object by the unique features and characteristics of the object itself the digital fingerprint renders unnecessary the use of arbitrary identifiers such as serial numbers or other labels and tags, etc.

Figure 2:
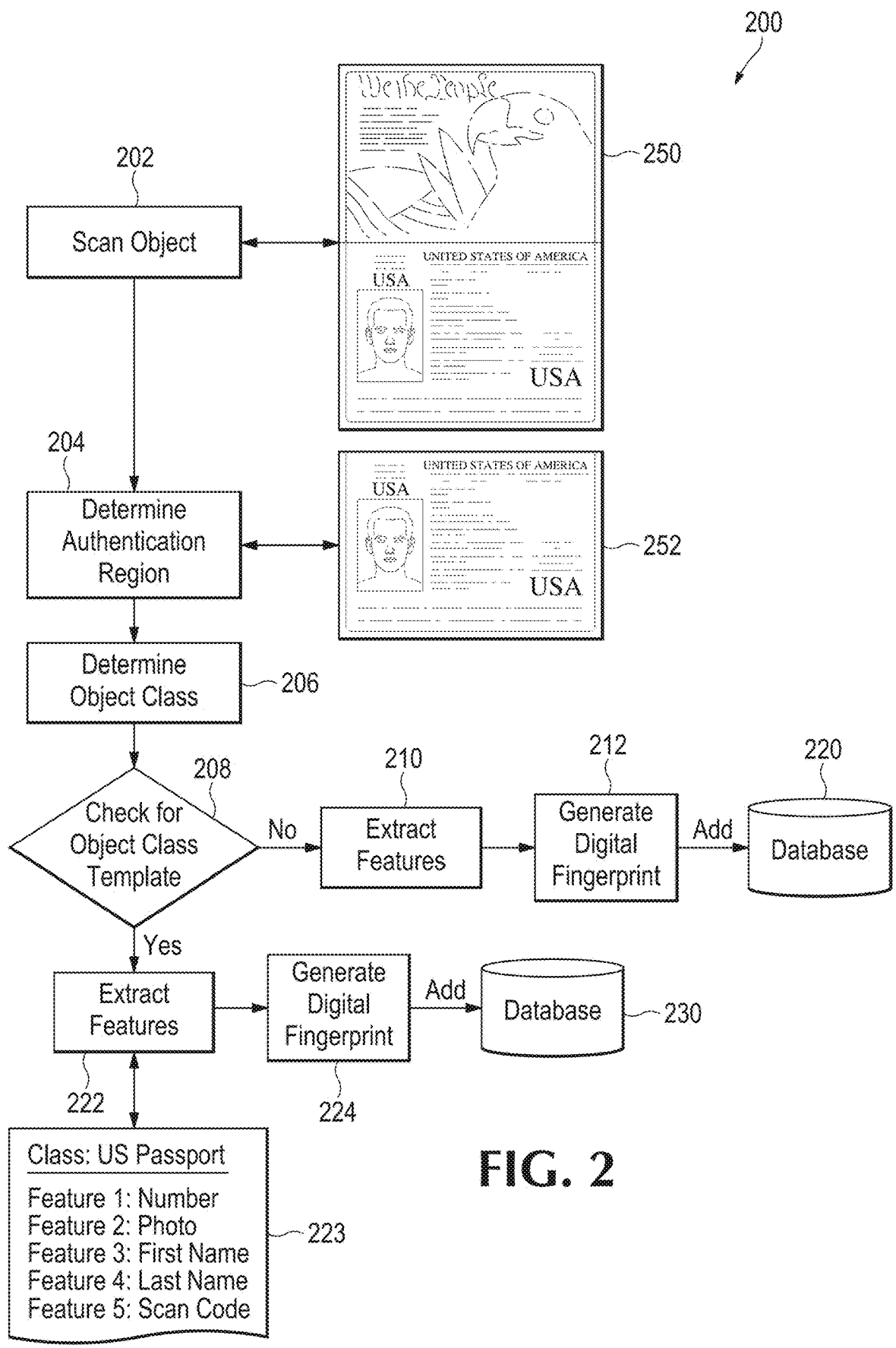
FIG. 2 is a simplified flow diagram of a process for digital fingerprint generation and registration.

FIG. 2 is a simplified flow diagram of a process 200 for digital fingerprint generation and registration. In this case, the process begins with scanning an object, block 202. An image 250 is acquired; in this illustration a U.S. passport is used. The next step is to identify or generate an authentication region, block 204. For example, the authentication region may be example 252. The authentication region may be identified, as discussed above, from a fingerprint template (see Table 1, supra). Next an object class of the object is determined, block 206. The result is used to check a database for a corresponding object class template, decision 208. If there is no matching template, the process proceeds to extract features, block 210, without the aid of a template. A digital fingerprint is created based on the extracted feature, block 212, and the digital fingerprint is stored in a database at 220.

Alternatively, if a matching object class template is found at decision 208, the process continues to extract features, block 222, utilizing the object class template 223 to identify and locate the features. Next, a digital fingerprint is generated from the resulting feature data, block 224, and stored in a database 230.

Example Authentication and Inspection Processes

In an embodiment, an object is scanned and an image is generated. The steps that follow depend on the operation to be performed. Several illustrative example cases are discussed below.

Case 1: For authentication of a previously fingerprinted object, the following steps may be followed (see FIG. 3, discussed below):
1. One or more authentication regions are either determined automatically by a system, or by utilizing the authentication region definitions stored in a fingerprint template.
2. Relevant features are extracted from each authentication region and a digital fingerprint is created. Feature extractions preferably will be in the form of feature vectors, but other data structures may be used as appropriate.
3. Optionally, a unique identifier such as a serial number may be extracted and stored to augment subsequent search and identification functions.
4. The digital fingerprint of the object to be authenticated is compared to digital fingerprints stored in a database.
5. The system reports whether the object matches one of the digital fingerprints stored in the database.
6. The system may store the digital fingerprint of the object to be authenticated in the database along with the results of the authentication process. Normally only the extracted features will be stored in the database, but the authentication image and/or the original image may be stored in the database, for example for archival or audit purposes.

Figure 3:
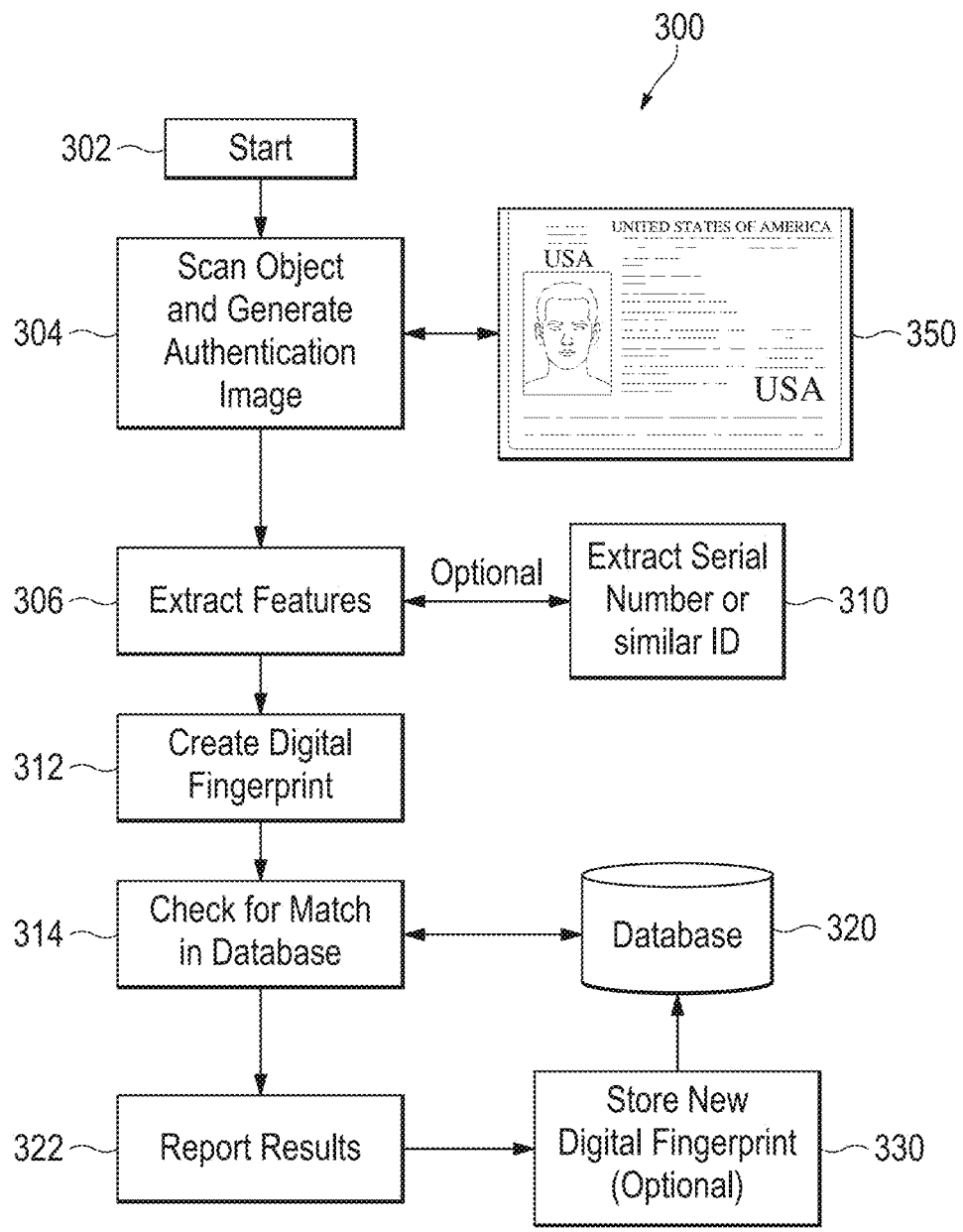
FIG. 3 is a simplified flow diagram of a process for authentication of a previously fingerprinted object.

FIG. 3 illustrates such a process 300 in diagrammatic form. Beginning at start block 302, the process scans an object and creates an authentication image, block 304. The image is represented at 350, using a passport as an example. Features are extracted, block 306, and optionally, other information, such as a serial number or similar ID number, preferably unique, may be extracted as well, block 310.

The extracted data is processed to create a digital fingerprint, bloc 312. A database 320 may be queried for a matching fingerprint, block 314. A "match" may be defined by a probability or similarity metric. Results of the database query may be reported to a user, block 322. Finally, a new digital fingerprint may be stored into the database 320, shown at process block 330.

Case 2: For inspection of specific features of a previously fingerprinted object to determine whether they have been altered, the steps are similar to Case 1, but the process is aimed at detection of alterations rather than authentication of the object:

1. One or more authentication regions are either determined automatically by the system, or by utilizing the authentication region definitions stored in a fingerprint template.
2. The features to be inspected are extracted from the authentication region and the digital fingerprint is created. The features extracted may be in the form of feature vectors for the features to be inspected but other data structures may be used as appropriate.
3. Optionally, other information, for example a unique identifier such as a serial number may be extracted and stored to be used to augment subsequent search and identification functions.
4. The digital fingerprint of the features to be inspected for alteration is compared to the fingerprint of the corresponding features from the original object stored in the database.
5. The system reports whether the object has been altered; i.e. whether the digital fingerprint of the features to be inspected match those previously stored in the database from the original object.
6. The system may then store the digital fingerprint of the features to be inspected in the database along with the results of the inspection process. Normally only the features will be stored in the database, but the authentication image and/or the original image may be stored in the database for archival or audit purposes.

Figure 4:
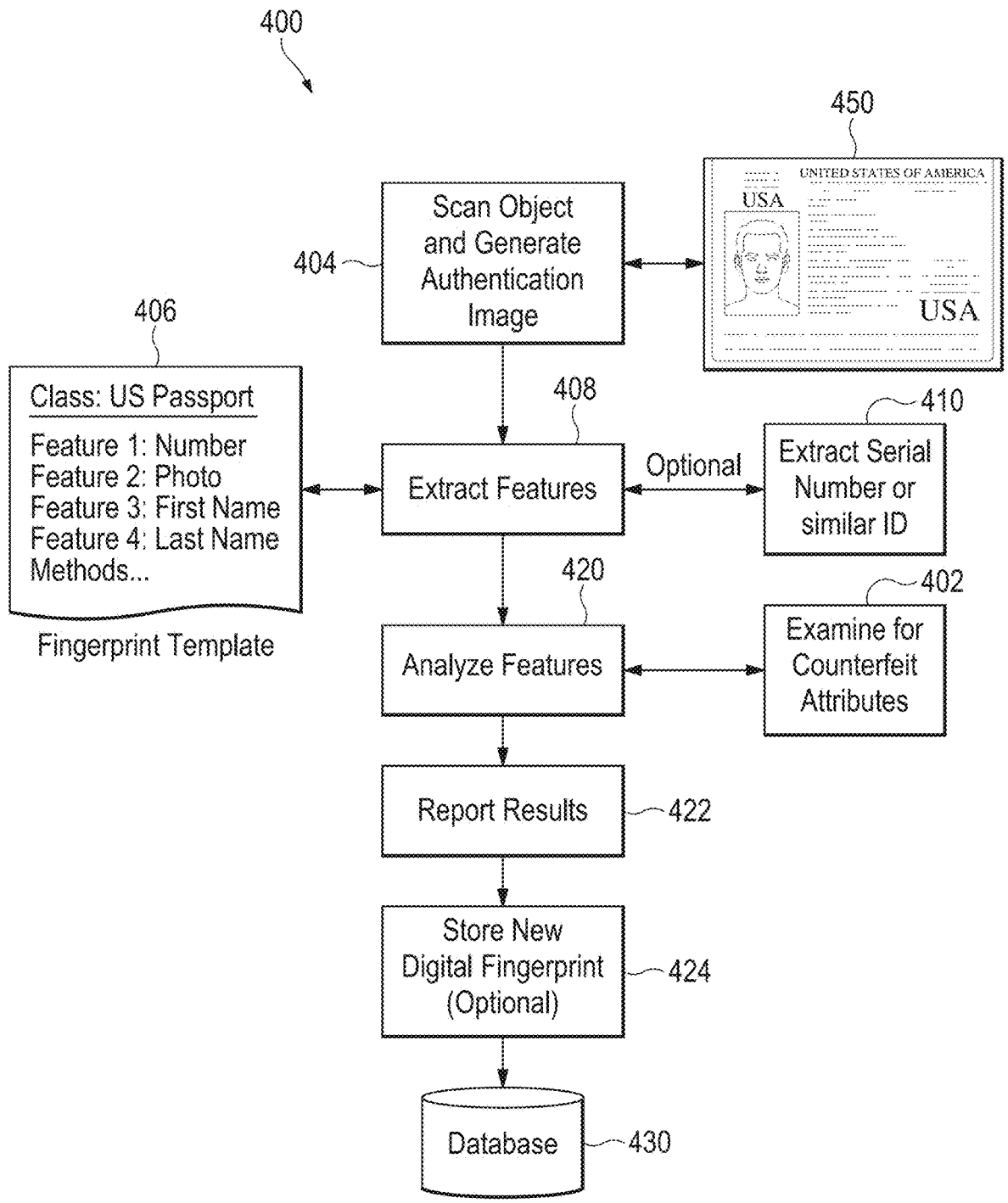
FIG. 4 is a simplified flow diagram illustrating a process for object inspection to detect evidence of counterfeits.

Case 3: For inspection of specific features of an object that has not been previously fingerprinted in order to determine whether the features have been altered, the following steps may be followed, referring now to FIG. 4.

A system scans an object, at block 404, and creates an authentication image 450 that includes at least one authentication region. Each authentication region may be determined automatically by the system, or by utilizing the authentication region definitions defined in a stored fingerprint template 406, as noted supra. Either way, the process next extracts features from the authentication region(s), block 408, and a digital fingerprint is generated. The extracted features preferably will be in the form of feature vectors, but other data structures may be used as appropriate.

The features of the object are then analyzed, block 420, and examined for attributes indicative of counterfeiting, block 402. Methods may be applied to the features by running programs that are listed in the fingerprint template 406 that match features with signs of counterfeiting. Features may also be statistically compared to features of other objects of the same class that are stored in the database, for example by using Bayesian algorithms or other methods to find suspect variations that the standard methods may not catch. Optionally, other information, such as a serial number or similar ID may be extracted, block 410.

The system preferably reports whether the object shows signs of alteration or counterfeiting, block 422. The system may then store the digital fingerprint of the object to be inspected, block 424, in the database 430 along with the results of the inspection process. Preferably only the extracted features will be stored in the database, but the authentication image and/or the original image may be stored in the database, for example for archival or audit purposes.

Figure 5:
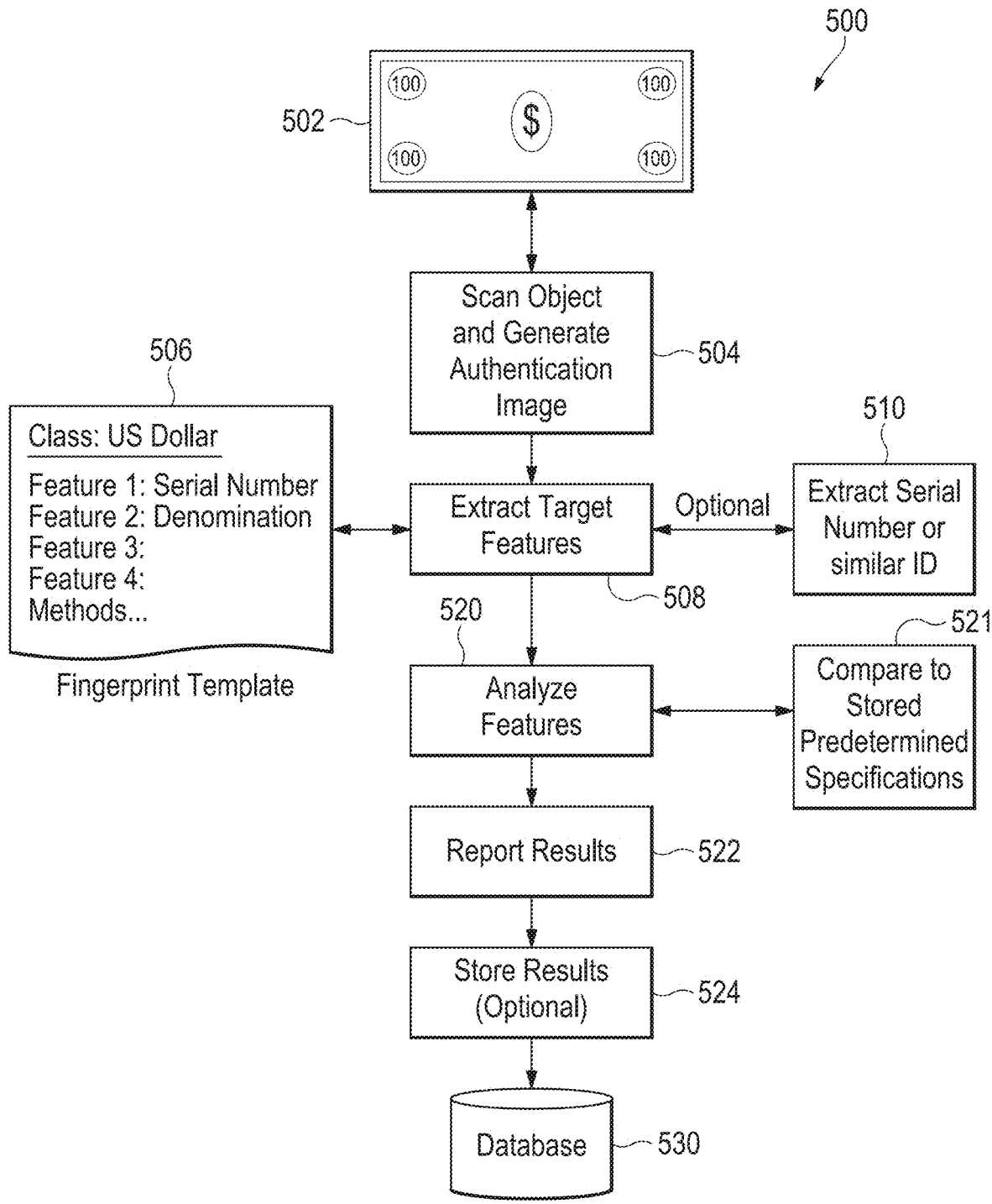
FIG. 5 is a simplified flow diagram illustrating an object inspection process.

Case 4: For inspection of an object to estimate how it conforms to one or more predetermined specifications—for example whether an object was manufactured in conformance with a manufacturer's specification, the following steps may be followed; referring now to FIG. 5. One or more authentication regions for an object 502 are determined by utilizing the authentication region definitions stored in a fingerprint template 506. In this illustration, the object 502 is a U.S. $100 bill. Scanning and generation of an authentication image are indicated at process block 504.

Target features are extracted from authentication regions, block 508, and a digital fingerprint is created (not shown). The feature extraction preferably will be in the form of feature vectors for the target features, but other data structures may be used as appropriate. Optionally, other information, including a unique identifier such as a serial number may be extracted, block 510, and stored to be used to augment subsequent search and identification functions.

Next, the digital fingerprint of the target features is analyzed, block 520, and compared to a fingerprint of predetermined features or specifications at block 521. In some embodiments, the predetermined features used for comparison are obtained by digitally fingerprinting a reference object (such as an ideal manufactured object), stored in a database at block 521. In other embodiments, the digital fingerprint of the object, and more specifically the feature vectors extracted from the target features, may be compared to reference feature vectors based on predetermined specifications that are stored in a database at 521. This type of comparison seeks to estimate the conformity of the object but may not indicate provenance The system reports, at block 522, whether the object meets specifications; i.e. whether the digital fingerprint of the target features sufficiently matches those stored in the database from the reference object (or reference specifications). The system may then store the digital fingerprint of the target features in the database 530, process block 524, along with the results of the inspection process. Preferably only the extracted target features will be stored in the database, but the inspection image and/or the original image may be stored in the database, for example for archival or audit purposes.

In all of the above cases, features may be extracted from images of objects scanned under variable conditions, such as different lighting conditions. Therefore, it is unlikely two different scans will produce completely identical digital fingerprints. In a preferred embodiment, the system is arranged to look up and match objects in the database when there is a "near miss." For example, two feature vectors [0, 1, 5, 5, 6, 8] and [0, 1, 6, 5, 6, 8] are not identical but by applying an appropriate difference metric the system can determine that they are close enough to say with a degree of certainty that they are from the same object that has been seen before. One example would be to calculate Euclidean distance between the two vectors in multi-dimensional space, and compare the result to a threshold value. This is similar to the analysis of human fingerprints. Each fingerprint taken is slightly different, but the identification of key features allows a statistical match with a high degree of certainty.

Figure 7:
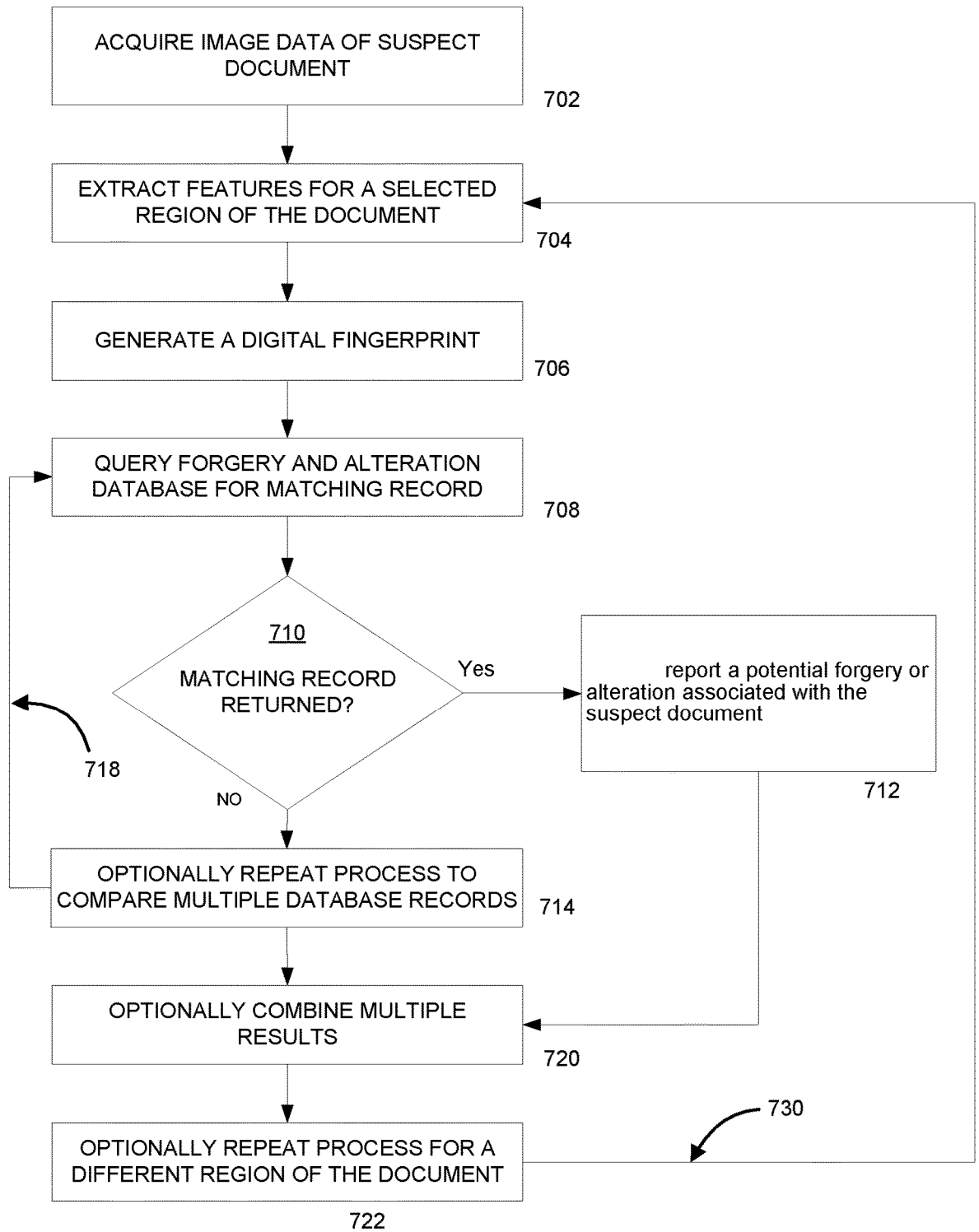
FIG. 7 is a simplified flow diagram illustrating a method for using a digital fingerprint of a suspect document to detect a potential forger or alteration associated with the document.
Figure 8:
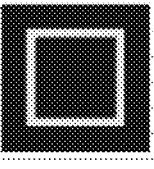
FIG. 8 is a simplified diagram of a prior art bitmap comparison method for comparing images.
Figure 9:
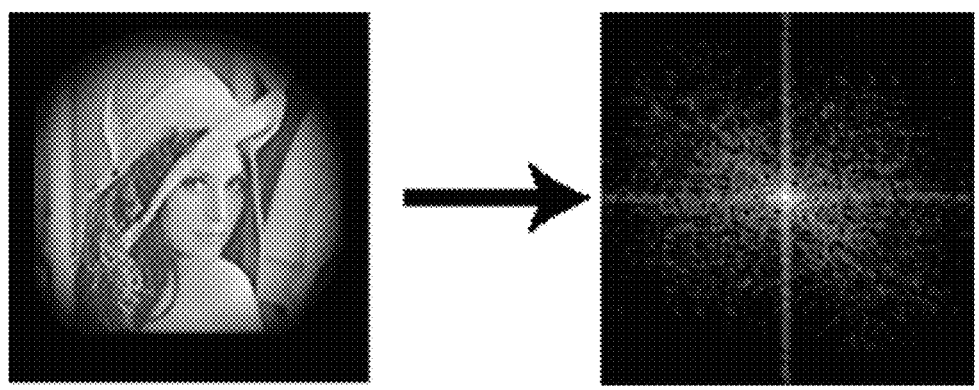
FIG. 9 is an example of a photograph and an image created by Fast Fourier Transform (FFT) of the image data.

FIG. 7 is a simplified flow diagram illustrating a method 700 for using a digital fingerprint of a suspect document to detect a potential forgery or alteration associated with the document. First, image data is acquired of a suspect document at block 702. Then the process extracts features from a selected region of the document, block 704. The extracted features are used to form a digital fingerprint, block 706. Next, the digital fingerprint or the extracted features are used to form a query, and the query is used to access a forgery and/or alteration database in search of a matching record, block 708. If a matching record is returned, at decision block 710, then the system may report a potential forgery or alteration associated with the suspect document, block 712. Optionally, multiple results may be combined in reaching a conclusion, block 720, where such are available.

Referring again to decision block 710, if no match is returned (i.e. no record matches the query criteria within a selected tolerance or confidence) the process optionally may be repeated, block 714, for comparison to additional database records. In other words, the database search may be expanded, see loop 718. Again, multiple query results may be combined. Further, the entire process, defined by loop 730, may be repeated for inspecting and analyzing additional or different regions of the document, block 722. As discussed earlier, multiple regions of interest may be defined. Terminal conditions, not shown, may be implemented. Although this illustration uses a document as an example the process may be applied to any physical object.

FIG. 10 is an illustration of an example of feature extraction from a digital image. The original image data, on the left, is searched by any of various software processes to detect and locate a feature in the image. In this case, the important shape in this image is a square, and the process extracts that feature, as shown in the middle of the figure, with "1" pixel values. (Real-world implementations preferably will have greater than one-bit pixel values.) Next, the extracted fingerprint feature may preferably be stored as a feature vector—as illustrated on the right side of the figure. A feature vector is an n-dimensional vector of numerical values that represent the shape.

In this instance, the features alone may be stored and not necessarily the entire image. In fact, after feature extraction the original image may be discarded by the user, which may offer advantages with respect to reduced storage requirements. Typical algorithms used for extracting features include, but are not limited to, edge detection, corner detection, blob detection, wavelet features, Gabor, gradient and steerable output filter histograms, scale-invariant feature transformation, active contours, shape contexts, and parameterized shapes.

FIG. 11 illustrates the same process for accessing a comparison or candidate image, extracting features from that image and storing each of them as a feature vector. Note that the example above is presented solely for the purpose of explanation—actual implementations will vary. For instance, many shapes may be parameterized and stored even more efficiently. Instead of storing all the pixels along the boundaries, the square in FIG. 10 might simply be stored as the lower left and upper right corner points ((x1, y1), (x2, y2)). Similarly, a circle might be stored with just the center point and radius. Feature vectors may store a wide variety of n-dimensional representations such as point, lines, polylines, edges, ridges, histograms, and many others.

Once features are extracted from the original image and the candidate image, the features can be compared directly to determine if there is a match. Typical algorithms for comparing features include, but are not limited to, nearest neighbor, hashing, indexing feature sets with visual vocabularies, support vector machines, multilayer perceptron, and random forests and ferns. An example of comparison of feature vectors is illustrated in FIG. 12, resulting in a match.

Figure 13A:
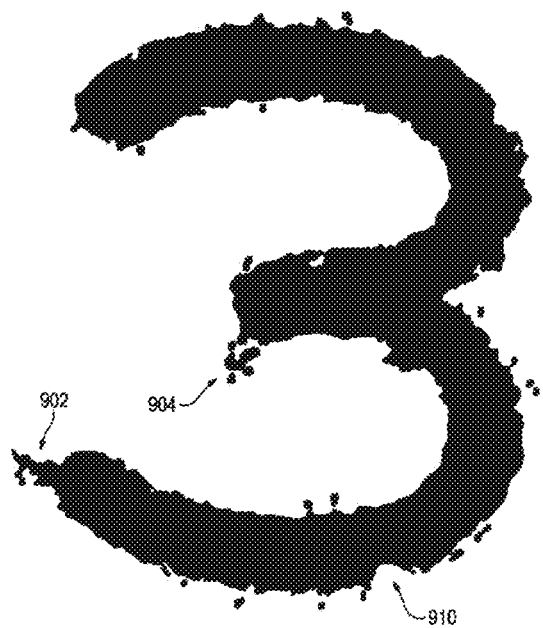
FIG. 13A shows an image of the numeral "3", representing the first digit in a serial number of an "original" or known U.S. dollar bill.

FIG. 13A illustrates an image of the numeral "3" representing a number printed on an "original" or known U.S. dollar bill. The bill may have been fingerprinted, for example, at the time of manufacture or public release, as described herein, or otherwise sufficiently authenticated for use as a reference. As noted below, fingerprint databases of currency and the like may be secured. Such databases preferably exclude raw image data. This image, on the order of about 40× magnification, shows a number of distinctive features visible to the naked eye.

Figure 13B:
FIG. 13B shows an image of the numeral "3", representing the first digit in a serial number of a U.S. dollar bill to be authenticated.

FIG. 13B illustrates an image of a number printed on a second or unknown U.S. dollar bill. The second bill may be fingerprinted using the same process, and then the resulting digital fingerprints, i.e., the respective fingerprint feature vectors, may be compared as further explained below, to determine whether or not the second bill is in fact the same one as the first bill. The comparison may take place even though the bill may have changed from wear and tear.

Figure 14A:
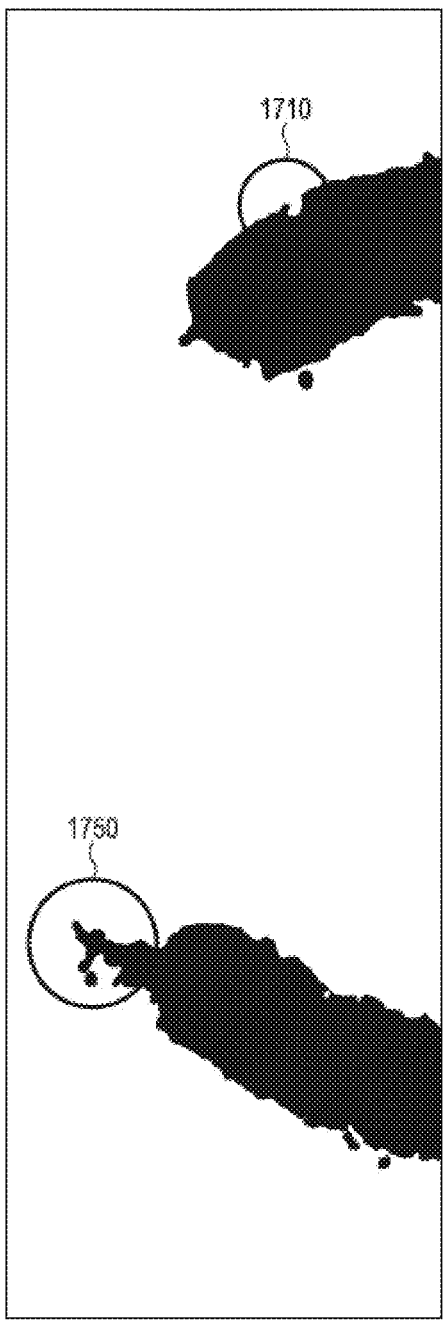
FIG. 14A is an illustration of results of feature extraction showing selected locations of interest in the image of FIG. 13A.
Figure 14B:
FIG. 14B is an illustration of results of feature extraction showing selected locations of interest in the image of FIG. 13B.

FIG. 14A is a simplified illustration of the results of feature extraction applied to the numeral 3 of FIG. 13A. In this figure, only the ends of the numeral are shown. Two areas of interest are called out by circles 1710 and 1750. Below is a discussion on how these areas may be selected in an image. Fingerprint feature extraction is applied to each of the circular regions. The results for each location are stored as fingerprint feature vectors. A collection of feature vectors, say for location 1750, may be stored as a feature vector array. FIG. 14B is a simplified illustration of the results of feature extraction applied to the numeral 3 of FIG. 13B. The same fingerprinting process is applied to this image. The same locations of interest as in FIG. 14A are labeled 1720 and 1760, respectively. The stored features (from the original object) are compared with the features extracted from the new object. If the features of the original object are not encountered in the second object, the object are not a match.

One advantage of the feature-based method is that when an object is worn from handling or use (even very worn), a system may still identify the object as original, which may be impossible with the bitmapped approach. FIG. 15A shows a numeral from the same dollar bill image as in FIG. 13A, juxtaposed with FIG. 15B for comparison. FIG. 15B shows the numeral on the same bill after the bill has been subjected to washing in a washing machine, perhaps as a result of being left in the pocket of a piece of clothing.

In FIG. 15B, the image (or, rather, the dollar bill) has been degraded; there is significant loss of ink and destruction of the paper surface in multiple locations. A bitmapped approach to matching would likely fail to match these two figures due to the large number of pixels that are now different, as relatively few of the pixels remain the same as the original.

FIG. 16A shows the detail of two fingerprint feature locations as before, 1610 and 1650. FIG. 16B shows detail of the damaged bill with the corresponding locations called out as 1620 and 1660, respectively. A comparison between the similarities of area 1610 to area 1620 and of area 1650 to area 1660 illustrates how a comparison of the corresponding fingerprint feature vectors would be adequate to result in a match. In practice, a much larger number of features would be used.

The image of the damaged bill is analyzed by a processor. The processor accesses a database of previously stored fingerprint data. If the dollar bill serial number is legible (by eye or machine), the record for the corresponding bill may be accessed from the datastore using the serial number as an index. Similarly, if any portion of the serial number is legible, the search for a matching record can be narrowed on that basis. Either way, a candidate record, containing a set of stored regions of interest may be compared to the image of the damaged bill.

As explained above, in addition to being able to recognize a worn object, the feature-based approach is able to address other external problems such as rotated images. This is especially important in a system where an unsophisticated user, such as a retail customer, may be scanning an object to be authenticated. In such cases, external factors like lighting and rotation may not be under the system operator's control.

Figure 17:
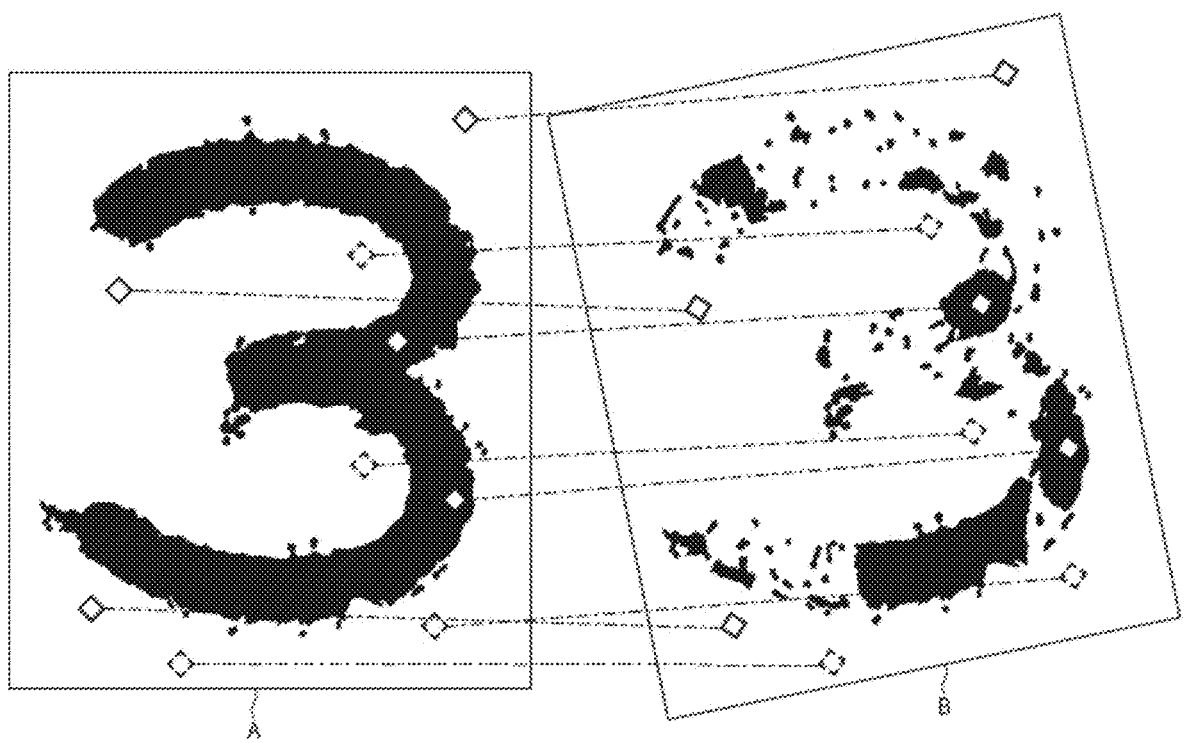
FIG. 17 is a simplified illustration of a rotational transformation in the process of comparing digital fingerprints of two images.

Referring now to FIG. 17, which shows the original image on the left side, with a small set of fingerprint features marked as small diamond shapes. This is merely a callout symbol for illustration. In some embodiments, as noted, preferably circular areas are used. For each feature (preferably identified in the database record), a search is conducted of the suspect image on the right side of FIG. 17 (or a portion of it) for a matching feature. The position may not match exactly, due to "stretch", an effective difference in magnification, and/or due to rotation of the image, or due to other circumstances. Although it may not match locations literally; a mathematical transformation may be defined that maps one image to the other, thereby accounting for rotation and stretch as appropriate. Thus, a bounding rectangle A indicated by the box in the left side image may be mapped to a quadrilateral, indicated by the line B in the right side image.

Once an appropriate transformation is found, further matching may be done to increase the level of confidence of the match, if desired. In some embodiments, a number of matches on the order of tens or hundreds of match points may be considered sufficient. The number of non-match points also should be taken into account. That number should preferably be relatively low, but it may be non-zero due to random dirt, system "noise", and other circumstances. Preferably, the allowed mapping or transformation should be restricted depending on the type of object under inspection. For instance, some objects may be inflexible, which may restrict the possible deformations of the object.

Summarizing the imaging requirements for a typical fingerprinting system, for example for inspecting documents, the system preferably should provide sufficient imaging capability to show invariant features. Particulars will depend on the regions used for authentication. For many applications, 10-fold magnification may be adequate. For ink bleeds on passports, bills, and other high-value authentication, 40-fold magnification may likely be sufficient. In preferred embodiments, the software should implement a flexible response to accommodate misalignment (rotation), misorientation, and scale changes. Color imaging and analysis is generally not required for using the processes described above, but may be used in some cases.

Hardware and Software

Most of the equipment discussed above comprises hardware and associated software. For example, a typical portable device is likely to include one or more processors and software executable on those processors to carry out the operations described. The term "software" is used herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present disclosure may include executable programs or instructions that are stored in machine-readable or computer-readable storage media, such as a digital memory. It is not to be inferred that a "computer" in the conventional sense is required in any particular embodiment. For example, various processors, embedded or otherwise, may be used in equipment such as the components described herein.

Memory for storing software is well known. In some embodiments, memory associated with a given processor may be stored in the same physical device as the processor (e.g. "on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include, but are not limited to, WORM, EPROM, EEPROM, FLASH, etc. Such technologies are often implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. It is also known that software can be distributed via electronic transmission ("download"), in which case there typically will be a corresponding software product at the transmitting end of the transmission, or the receiving end, or both.

Integration with Bill Processing Equipment

The creation of fingerprint data is proposed at the U.S. Treasury or any other producer and/or printer of negotiable bills or notes. Preferably, such a system utilizes random, microscopic features unique to each bill's paper and printing. For example, the system may extract features from unpublished locations on the bills. In other words, the specific locations used for authentication are maintained in secrecy. A "feature template" may be used, and the locations for feature extraction may be stored in the feature template, which in turn is stored in a secure database. The extracted features may be converted into encrypted feature vectors and associated in a data store with the corresponding bill serial number (the serial number having been readily captured by the same scanner or a separate one). In this way, a protected database may be created that is addressable or searchable by serial number or feature vector, but only by authorized users. A "user" may be a machine with electronic access to the database.

Equipment is known for stacking, counting, and "strapping" paper money notes. A "strap" is a package of 100 notes, held together by a single paper band, as required for deposit by U.S. Federal Reserve rules. Note-handling equipment may be modified to include a digital scanner, for example an optical scanner, to capture images of each bill or note as it is processed. The scanner may be coupled to a suitable processor, as explained above, for storing the captured images, for processing the images to authenticate them, and/or to detect counterfeit objects.

Preferably, such a system is granted access to the protected database that is searchable by serial number or digital fingerprint. It may then look up each bill scanned, and compare features of the digital image to the digital fingerprint stored in protected database for the corresponding serial number. This process may be done by batch or in real time or near real time. The comparison, as further described above, may provide a confidence metric, a simple yes/no (authentic/counterfeit) result for each note, or a different suitable metric. It may identify a counterfeit note by serial number, but also by sequence number to facilitate locating the bill ("the 28$^{th}$ bill in the strap #218"). In this way, a bank or other institution can detect counterfeit notes in a timely manner.

In another embodiment, a scanner, which may be portable and optionally wireless, may be made available at a bank teller station for the teller to authenticate bills presented for deposit or exchange. Further, such a system may be installed at an ATM machine to automatically authenticate bills presented for deposit. The ATM may be programmed to accept both authenticated and counterfeit or suspected counterfeit bills to get them "off the street" but flag them as counterfeit or suspect.

The term "note" is commonly used in the U.K. with regard to paper money, while the term "bill" is more common in the U.S. The terms are used interchangeably herein. Not to be confused with U.S. Treasury "bills" and "notes" which are not currency but debt instruments. That said, the present disclosures herein are applicable to those as well as currency, although nowadays such things are mainly processed by electronic "book entries" rather than paper documents. Older U.S. Savings Bonds, and any other bearer instruments in any country, can all be authenticated by various embodiments of the present disclosure.

Induction and Authentication

Figure 18:
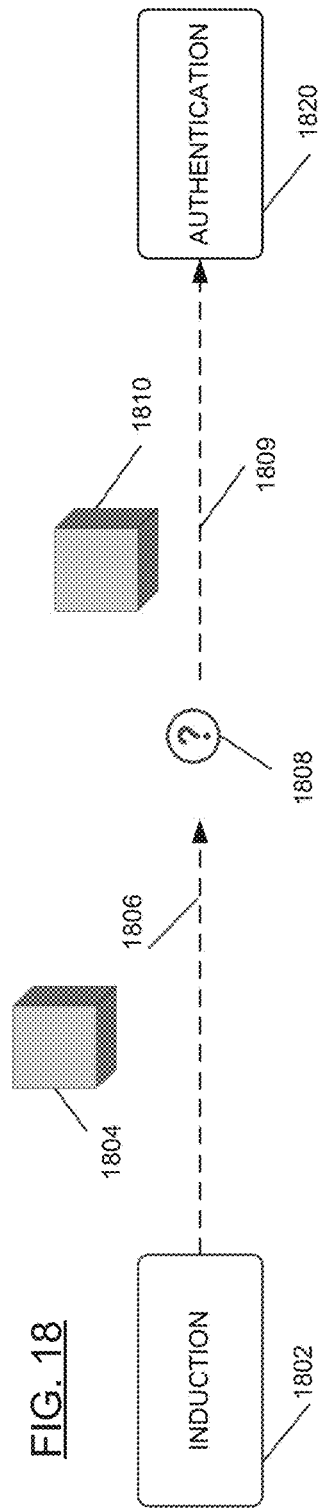
FIG. 18 is a simplified flow diagram of an induction-authentication process.

FIG. 18 is a simplified diagram illustrating the concepts of induction and authentication. The term "induction" is used in a general manner to refer to entering an object or a set of objects into an electronic system for subsequently identifying, tracking, or authenticating the object, or for other operations. The object itself is not entered into the system in a physical sense; rather, induction refers to creating and entering information into a memory or datastore from which it can later be searched, interrogated, retrieved, or utilized in other kinds of database operations.

In FIG. 18, induction 1802 thus may refer to a process that includes capturing an image of an object (or part of an object), processing the image to extract descriptive data, storing the extracted data, or any or all of these operations. The inducted object, represented by a cube 1804, then leaves the induction site, and proceeds in time and space along a path 1806. Induction may be done at the point of creation or manufacture of the object, or at any subsequent point in time. In some cases, induction may be done clandestinely, meaning without the knowledge of the person or entity currently having possession of an object. The term "possession" is used in the broadest sense to include, for example, actual physical possession, as well as control—for example, having they key to a secure physical storage where an object is kept.

After induction, the object 1804 may encounter wear and tear, and otherwise may change, intentionally or not, in ways that may not be known a priori, represented by the question mark 1808. The original object 1804 may even in fact be lost or stolen after induction and a counterfeit may be introduced. Along path 1809, an object 1810 may be presented for authentication, represented by block 1820. Below are described some additional scenarios and use cases for the authentication technology described herein, and what may be done under the broad heading of "authentication". Under many circumstances, induction, authentication, or both may be done remotely by use of technology such as drones or by other covert means. In one example, an agent may take a photograph of an object with a smartphone, without the knowledge or consent of the possessor of the object, and the resulting image may be utilized for induction and/or authentication as described herein.

More specifically, in some embodiments, some part of the induction/authentication process may be done remote from a facility intended for that purpose. In addition, some part of the induction/authentication process may be accomplished without the knowledge of the then-current possessor of an object. In particular, the induction and/or authentication are not part of the current possessors' normal processes. These two criteria are not essential for the present disclosure, but are generally representative of some applications.

Figure 19:
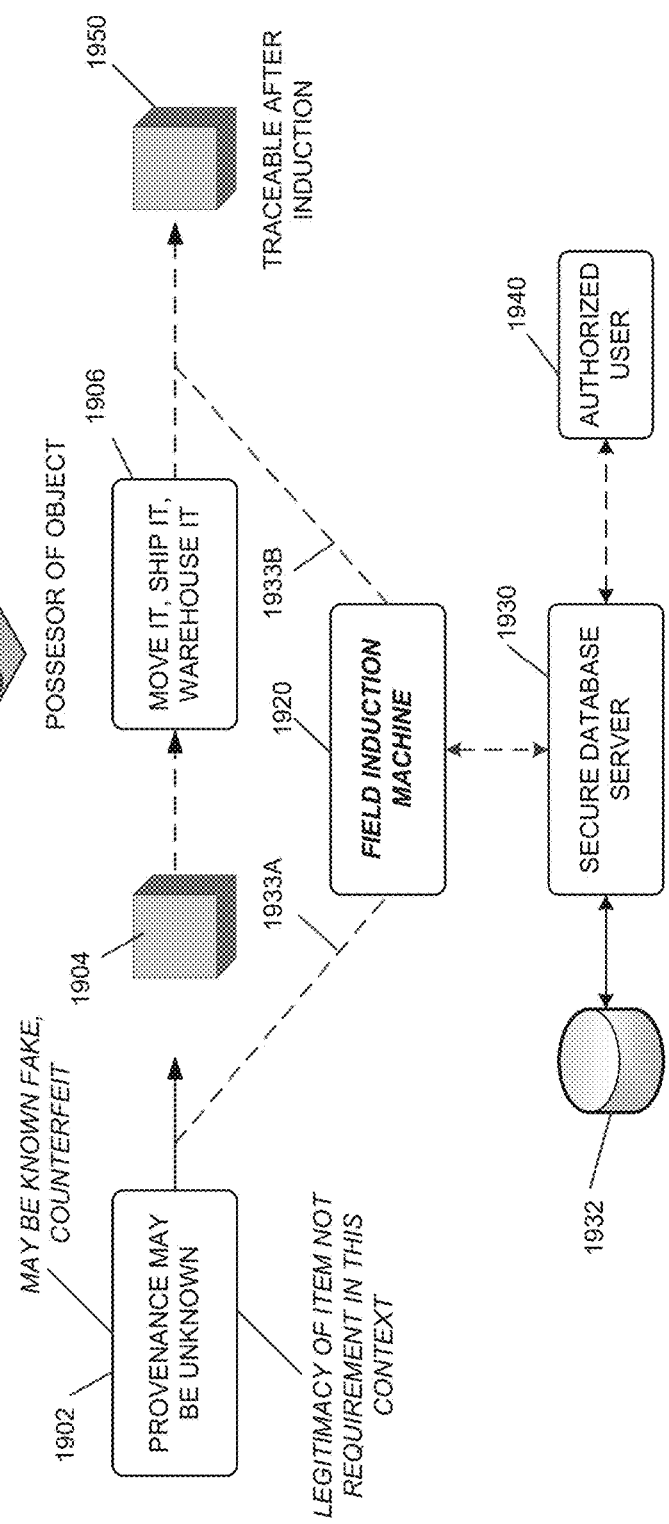
FIG. 19 is a simplified flow diagram of an in-field induction process to enable tracing an object.

FIG. 19 is a simplified flow diagram illustrating several different scenarios to enable tracing an object. In this example, beginning at block 1902, an object 1904 is of interest, but its provenance may be unknown. The object may be counterfeit or a genuine article. Moreover, the object may be stolen or dangerous in the wrong hands. The object's background, legitimacy, or provenance is not a requirement in this scenario. In this process, the object 1904 may be inducted at virtually any time and place where the object (or its digital image data) may be found, indicated by dashed lines 1933A and 1933B, using a field induction machine 1920. This process may be overt or clandestine. A field induction machine 1920 may comprise a scanner, camera, or the like, as discussed above, to capture an image of the object 1904 or a part of it. Certain parts of an object may be selected for imaging based on the type of object. The machine 1920 may comprise a processor for processing the image data to form digital fingerprints as described above. In other embodiments, the machine may have communications capability to send the raw image data for processing elsewhere—or it may store the image for later use. In some embodiments the data is processed to extract features from the image data, as explained in detail earlier, and the extracted feature information is stored in the form of feature vectors, preferably in a secure datastore.

The field induction machine 1920 may be controlled remotely or it may act autonomously. The machine may receive instructions on "where to look" for features in captured image data. The "where to look" information may be in the form of a feature template. Feature template information may be pre-programmed into the field induction machine, or it may be downloaded from a remote source. In another embodiment, the field induction machine 1920 may itself process image data to find regions of interest and extract feature information from those regions of interest. The field induction machine may send the extracted feature information, preferably in the form of feature vectors, to a secure database server 1930. In some embodiments, the field induction machine 1920 may send raw image data to the server 1930, which in turn will process the data to extract feature information, and store that information in a datastore 1932.

Previous patents have dealt with induction/authentication of objects known to be genuine at the point of induction (e.g. machine parts before they leave the manufacturer and enter the supply chain) or objects which have some form of "second provenance" such as induction in concert with an expert or authority, for example a wine or art expert, authenticating the object. Here, legitimacy of the object is not in view. For example, a device such as field induction machine 1920 could be used in the field by a third party, such as a law enforcement agency, to surreptitiously induct, for example, counterfeit or suspected counterfeit currency at or near the point of production, with the "authentication" to be performed later at a bank where the counterfeit is recognized. This section of the disclosure is not primarily used to authenticate an object as genuine, but rather to provide traceability to determine where and how a possibly counterfeit or nefarious object has been moved. Put another way, the methods and apparatus described in this section may be used to "authenticate" (trace or identify) known counterfeit objects.

The object 1904, once inducted as above, can then be moved, shipped, warehoused, bought, sold, etc. (block 1906) regardless of the legitimacy of its production or use at either the points of induction or authentication. Dashed lines 1933A-1933B are intended to indicate that a field induction process may take place at any time or location during the life of the object. Whenever and wherever it occurs, the object 1950 is thereafter traceable by using the stored authentication data.

In some embodiments, the datastore 1932 may be accessed or queried by an authorized user 1940, which may be done remotely and programmatically. The present methods and apparatus may be used in at least the following three illustrative applications.

A. Controlled Induction, Stealth Authentication

In one illustration, police or other officials may have seized currency or weapons during a criminal investigation. The officials induct the seized objects in case the objects are later stolen from their holding facility so as to make possible the tracking of the movements of the stolen objects and/or discovery of the thief. The induction may be done with a field induction machine as described above. In another example, the seized evidence may be moved to a different location such as the police station, and inducted there. The field induction machine may be located at such a location. An example would be the "Operation Fast and Furious", except done correctly. Weapons are inducted ("fingerprinted") at point of known provenance (manufacture, purchase, possession by a government agency) but there is risk of criminal use of a gun later. Any authentication will, however, be under far less controlled circumstances, including possible in-field clandestine authentication.

Figure 20:
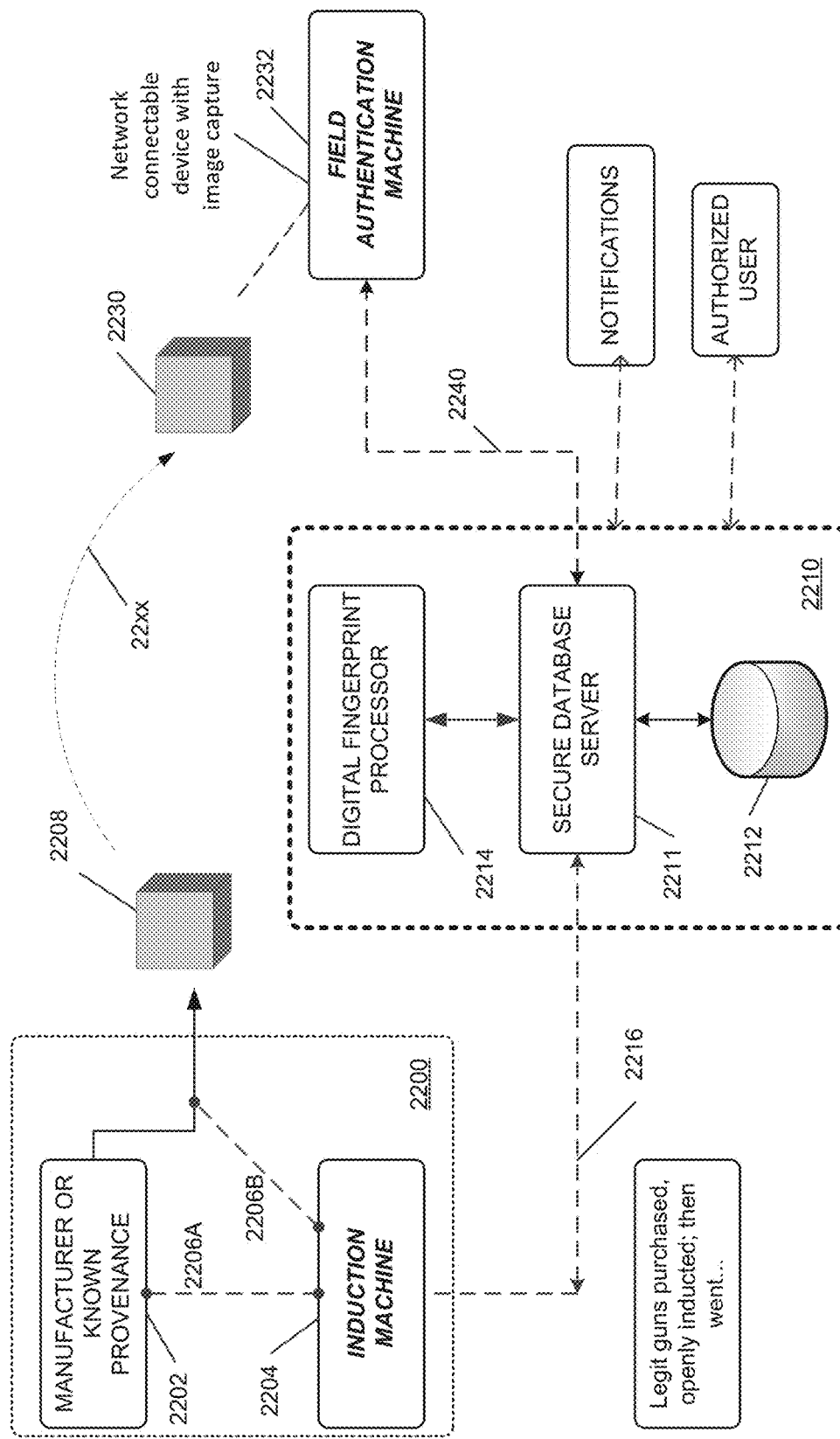
FIG. 20 is a simplified flow diagram of a process utilizing controlled induction and stealth authentication of an object, utilizing a centralized, secure, digital fingerprinting system.

FIG. 20 illustrates one example of this type of situation. A controlled induction site 2200 may be a location of manufacture or of known provenance, 2202. An induction machine 2204 may be similar to the field induction machine 1920 in FIG. 19, but here the induction machine 2204 is located within the controlled induction environment. The dashed lines are to indicate, 2206A, the case in which the induction machine is integrated into a manufacturing apparatus for inducting objects immediately after or even during manufacture, thus ensuring that only genuine objects are inducted. In another case, 2206B, the induction machine may be arranged for induction after manufacturer is completed but before the object 2208 leaves the controlled induction environment 2200. A fingerprint system 2210 may comprise a secure database server 2211, coupled to a datastore 2212. The system 2210 may be located remotely, "in the cloud", or at a physical location. A processor 2214 may be configured to process image data received from the controlled induction site 2200 via path 2216 and store extracted feature vectors in the datastore 2212.

After the inducted object 2208 leaves the controlled environment 2200 it may be subjected to various changes, intentionally, unintentionally, or through normal "wear and tear". The use, handling, storage, transfer, etc. of the object are unknown, indicated by dashed line 2210. Thus an object 2230 may or may not be the same object as 2208; but whether or not it is may be determined by authentication.

Authentication may be implemented by a field authentication machine 2232. A field authentication machine may comprise a scanner and other elements similar to a field induction machine. Preferably, the authentication machine 2232 is network connectable for transfer of captured image data. The primary function is to capture image data, process it (locally or remotely), and compare the processed data, preferably comprising feature vectors, to data previously stored in a datastore. This may be done using a secure database server such as 2211. The data may be accessible to an authorized person or entity 2240. For example, a remote process (not shown) may query the database server for an authentication operation at another location. In some embodiments, the authentication machine 2232 may access the stored data and conduct the comparison. In another embodiment, the authentication machine 2232 may submit the authentication data, for example, raw image data, to the secure database server, for processing and then comparison to stored data. Thus, the server 2211 may return an authentication result via communication path 2250 to the machine 2232. The processor 2214 and or the database server 2211 may provide notifications if so configured, block 2252. Authentication will in some cases be under far less controlled circumstances (than, say 2200) including possible in-field clandestine authentication.

B. Stealth Induction, Controlled Authentication

Another situation is illustrated by the currency example where a covertly captured digital fingerprint (a set of feature data or feature vectors) has been obtained at the point of creation but authentication takes place at a bank, customs office, or with the FBI.

C. Stealth Induction, Stealth Authentication.

In this example, both the induction and the authentication are done clandestinely. In one example, known terrorists are seen moving weapons. Fingerprintable information is captured covertly without the terrorists knowing by some form of robotics, satellite, local agent, or other means of clandestine collection. The fingerprint information may be collected by scanning an object or document without removing it from its then-current location. Portable equipment may be used, including a smartphone or the like with a camera. Subsequently, another group is observed moving arms. The same process occurs, but now the objects may be authenticated, alerting security forces to the presence of the same objects in two known, illicit, locations as well as enabling the tracing of shipment paths and other associated factors. The process used may be similar to the illustration of FIG. 19.

Figure 21:
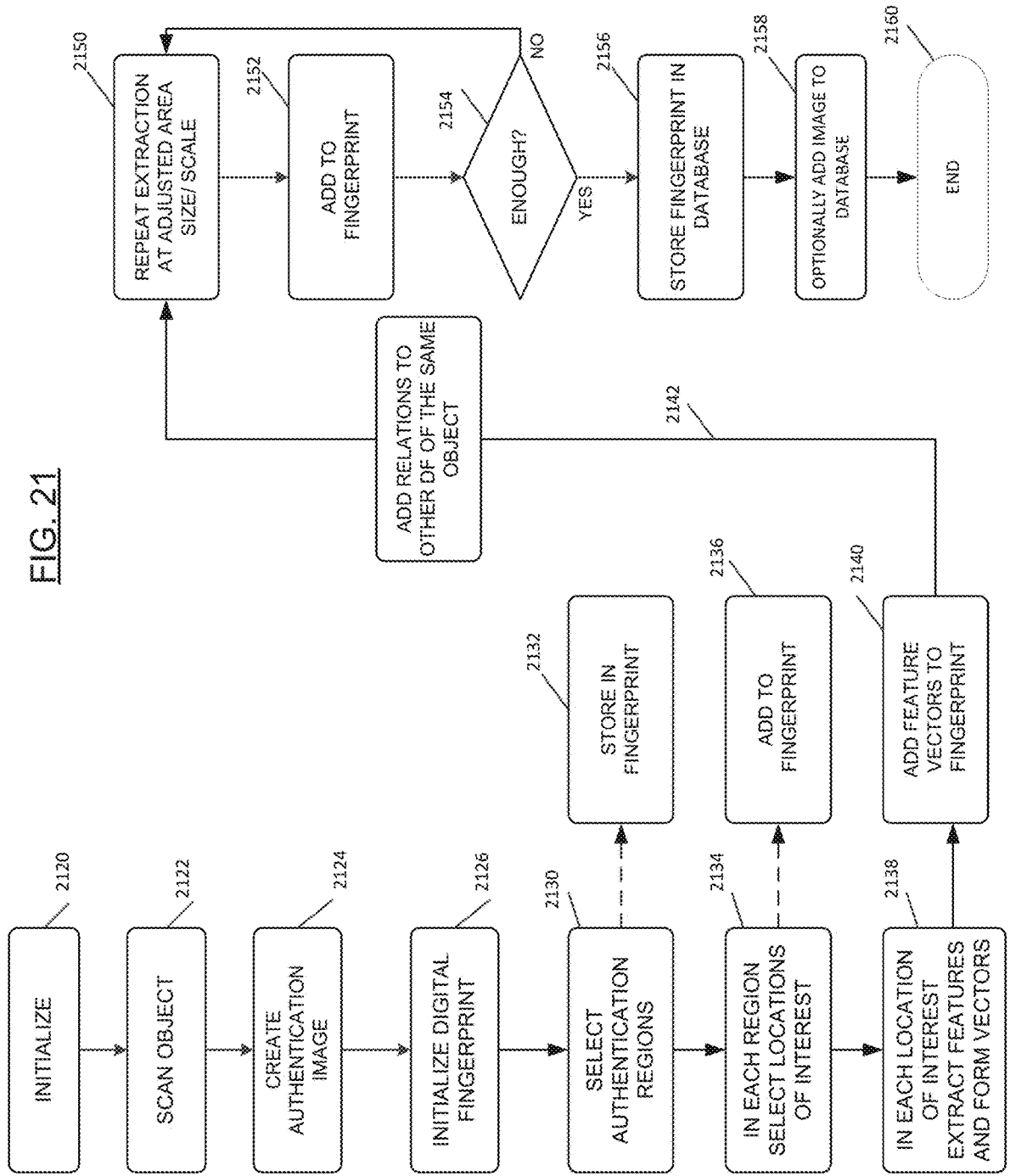
FIG. 21 is a simplified flow diagram illustrating an example of a process for creating a digital fingerprint comprising feature vectors from scan data.

FIG. 21 is a simplified flow diagram of one example of a process for creating a "digital fingerprint" that includes feature vectors based on a scanned image of an object. The process begins with initialization at block 2120. This may comprise initializing a datastore, calibrating an image capture system, or other preliminary operations. An object or item is scanned, block 2122, forming digital image data. From the image data, an authentication image is created, which may comprise all or a selected subset of the scan data. Next, a digital fingerprint may be initialized, for example in a memory or datastore.

To begin forming a digital fingerprint of the scanned object, at least one authentication region is selected, block 2130, in the authentication image data. Each authentication region may be selected according to a predetermined template based on the class of objects. Locations of the authentication regions may be stored in the fingerprint, block 2132.

At block 2134, the process continues by selecting locations of interest within each authentication region. To select locations in an image to extract fingerprint vectors, a software process automatically selects a large number—preferably hundreds or even thousands per square mm—of preferred locations of interest for purposes of digital fingerprinting. A location may be of interest because of a relatively high level of content. That "content" in a preferred embodiment may comprise a gradient or vector, including a change in value and a direction. Selected areas of interest are added to the fingerprint, block 2136. In one example, such areas may be identified by a location or centroid and a radius thus defining a circular region. Circular regions are preferred for some applications because they are not affected by rotation of the image.

Next, block 2138, the process calls for extracting features from each area of interest and forming feature vectors to describe those features in a compact form that facilitates later analysis, for example, calculation of vector distances as a metric of similarity in comparing fingerprints for authentication. Various techniques are known for extracting such features. The resulting feature vectors are added to the fingerprint, block 2140. At block 2142, additional information may be added to the fingerprint, for example identifying other fingerprints associated with the same object. In some embodiments, a relationship, such as relative location of the other fingerprints to the current fingerprint may be used. For example, in some objects, multiple regions may be authentic individually, but a change in their relative location may indicate that the object is not authentic. An example involving a weapon was given above.

The feature extraction may be repeated, block 2150, using an adjusted area size or scale (magnification). Feature vectors created at the adjusted size may be added to the fingerprint, block 2152. Additional features may be extracted at additional magnification values, until an adequate number are provided, decision 2154. This additional data may be added to the fingerprint, block 2156. This data may be helpful in finding a matching fingerprint in instances where the authentication image magnification is not the same as the image at the time of induction of the object. Finally, and optionally, the scanned image itself (2122) may be added to the database, block 2158. This process to build a digital fingerprint ends at 2160.

Examples of Apparatus Embodiments

In some embodiments, an apparatus to implement features disclosed above may include: a capture device arranged to generate image data responsive to a region of a physical object; a processor having electronic access to the image data; the processor arranged to execute stored instructions for processing the image data, the stored instructions arranged to cause the processor to— access a predetermined fingerprint template associated with a class of objects of which the physical object is or may be a member; wherein the fingerprint template specifies an authentication region, at least one location of interest within the authentication region, a method for extracting a feature vector characterizing the location of interest, and a method for comparing the extracted feature vector to a reference feature vector;

based on the fingerprint template, identify a subset of the image data corresponding to the authentication region; based on the fingerprint template, extract a feature vector from the subset of the image data; and store extracted feature vector data defining the extracted feature vector in a database.

In some embodiments, an apparatus as described above may be modified wherein the capture device comprises at least one of a scanner, a camera, a specially-adapted sensor array such as CCD array, a microscope, a smartphone camera, a video camera, an x-ray machine, a sonar, an ultrasound machine, a microphone, or any other device responsive to electromagnetic radiation or mechanical wave.

In some embodiments, an apparatus as described above may be modified wherein the stored instructions further control the processor to compare the extracted feature vector data to reference feature vector data, without regard to the image data generated by the capture device, to estimate whether or not the physical object matches the reference feature vector data.

In some embodiments, an apparatus as described above may be modified wherein the estimation includes quantifying the comparison and then comparing the quantified comparison result to a predetermined tolerance.

In some embodiments, an apparatus as described above may be modified wherein the extracted feature vector data defines a contiguous geometric shape and a location of the geometric shape in the authentication region.

In some embodiments, an induction apparatus to implement features disclosed above may include:

a scanner arranged to acquire digital image data representing an image of at least a portion of a physical object positioned within an operative distance from the scanner;

a digital processor coupled to the scanner to receive the digital image data;

a memory accessible to the digital processor and storing a fingerprint template comprising data usable by the processor that specifies a class of objects and at least one authentication region for the class of objects;

the digital processor configured to execute instructions to— locate an authentication region in the acquired image data based on the stored fingerprint template;

select a portion of the digital image data corresponding to the located authentication region;

process the selected portion of the digital image data to identify a location of interest within the located authentication region;

form a feature vector characterizing the location of interest;

store the feature vector in a database as part of a digital fingerprint of a scanned object.

In some embodiments, the induction apparatus as described above may be modified wherein the authentication region comprises a hierarchy of one or more authentication sub-regions, each sub-region containing at least one location of interest.

In some embodiments, the induction apparatus as described above may further include: a network interface coupled to the digital processor to enable data communications over a network; the network interface enabling the processor to receive and store a fingerprint template for use by the apparatus in creating a digital fingerprint for a given class of objects.

In some embodiments, the induction apparatus as described above may include:

a network interface coupled to the digital processor to enable data communications over a network; the network interface enabling the processor to transmit the feature vectors for storing the digital fingerprint of a scanned object in a remote database system coupled to the network.

In some embodiments, the induction apparatus as described above may be modified wherein the scanner, the processor, and the memory are disposed in a portable system for data capture in the field.

In some embodiments, the induction apparatus as described above may be modified wherein the scanner and the processor together implement image magnification in a range of approximately 10× to 40× the size of the physical object.

In some embodiments, the induction apparatus as described above may be modified wherein the scanner and the processor together implement image magnification that is selectable based on the fingerprint template.

It will be obvious to those having skill in the art that many changes may be made to the details of the above-described embodiments without departing from the underlying principles of the disclosure. The scope of the present disclosure should, therefore, be determined only by the following claims.

The invention claimed is:

1. A computer-implemented method comprising:
providing a digital fingerprint induction machine including a scanner arranged to capture digital image data;
deploying the induction machine in a controlled induction environment that includes a manufacturing apparatus;
in the controlled induction environment, integrating the induction machine into the manufacturing apparatus, the integrating step including arranging the scanner to capture digital image data of at least a portion of a physical object during or following production of the physical object by the manufacturing apparatus;
using the scanner, capturing digital image data of at least a portion of a physical object during or following production of the physical object by the manufacturing apparatus and before the physical object leaves the controlled induction environment, so as to ensure that the digital image data captured by the scanner is digital image data of the physical object actually produced by the manufacturing apparatus;
selecting at least one authentication region of the digital image data captured by the scanner;
analyzing the at least one authentication region of the digital image data captured by the scanner to form a digital fingerprint of the physical object, wherein the digital fingerprint comprises:
(a) for each authentication region of the at least one authentication region:
data identifying the authentication region, the data including a location of the authentication region in the image data;
data identifying at least one location of interest in the authentication region; and
for each location of interest of the at least one authentication region, data identifying at least one feature vector that characterizes the location of interest; and
(b) data identifying at least one of the induction machine, the manufacturing apparatus and the controlled induction environment; and
storing the digital fingerprint in a database before the physical object leaves the controlled induction environment.

2. The method of claim 1 wherein the digital fingerprint further comprises authentication region data including a hierarchy of one or more authentication sub-regions, each sub-region including at least one location of interest within the sub-region.

3. The method of claim 1 wherein at least one authentication region is allocated a utility weight or ranking.

4. The method of claim 1 wherein, for each location of interest of the at least one location of interest, at least one corresponding feature vector identifies coordinates of the location of interest and a digital characterization of the location of interest.

5. The method of claim 1 further including automatically selecting the at least one authentication region and corresponding locations of interest in accordance with a predetermined fingerprint template.

6. The method of claim 5 wherein the fingerprint template comprises a stored data structure that specifies a class of objects of which the physical object is a member, at least one authentication region for the class of objects, and at least one location of interest within the authentication region for generating a digital fingerprint of the object.

7. The method of claim 5 wherein the fingerprint template defines a method of extracting information from locations of interest, and a method for comparing the extracted information with potentially matching information.

8. The method of claim 1 wherein the storing the digital fingerprint includes storing the digital fingerprint without storing in the database the digital image data captured by the scanner.

9. The method of claim 1, further comprising extracting the at least one feature vector to generate the data identifying the at least one feature vector, the extracting comprising utilizing an algorithm among a class of algorithms that is characterized by one or more of edge detection, corner detection, blob detection, wavelet features, Gabor, gradient and steerable output filter histograms, scale-invariant feature transformation, active contours, shape contexts, and parameterized shapes.

10. The method of claim 1 and further comprising:
obtaining a digital fingerprint of a target object;
using the digital fingerprint of the target object, querying the database to generate a result; and
taking a predetermined action based on the result indicating a matching record in the database within a selected tolerance or confidence level.

11. The method of claim 10 and wherein the comparing step comprises utilizing an algorithm of a set of algorithms characterized by nearest neighbor, hashing, indexing feature sets with visual vocabularies, support vector machines, multilayer preceptor, and random forests and ferns.

12. The method of claim 1 wherein the physical object comprises any one of: government-issued documents, legal and financial documents, mail pieces, parcels, art, photographs, coins, currency, precious metals, gems, jewelry, apparel, mechanical parts, consumer goods, electronics, apparel, toys, integrated circuits, weapons, pharmaceuticals, drugs, chemicals, alcohol, tobacco, and food and beverages.

13. The method of claim 1 further including:
in a digital fingerprint of a selected physical object produced by the manufacturing apparatus, storing data identifying other digital fingerprints associated with the selected physical object; and
in the digital fingerprint of the selected physical object, storing data identifying relative locations of the other digital fingerprints associated with the selected physical object to a location of a current digital fingerprint.

14. The method of claim 1 wherein each digital fingerprint formed by the processing of the captured digital image data comprises:
data identifying at least one authentication region, the data including a location of the at least one authentication region in an image of the physical object;
for each authentication region of the at least one authentication region:
data identifying at least one location of interest in the authentication region; and
for each location of interest of the at least one location of interest, data identifying at least one feature vector that characterizes the location of interest on the physical object and;
data identifying the manufacturing apparatus.

15. The method of claim 14 wherein the at least one authentication region comprises a hierarchy of one or more authentication sub-regions, each sub-region of the hierarchy of one or more authentication sub-regions containing at least one location of interest.

16. The method of claim 1 further comprising:
processing captured digital image data to form digital fingerprints of a plurality of objects, wherein the digital fingerprints comprise digital fingerprints of a plurality of objects of a given class, which objects of the given class conform to a predetermined object specification; and
collecting the digital fingerprints to form a machine-readable conforming object database for use in comparing potentially conforming objects of a same class.

17. The method of claim 1 wherein the at least one authentication region comprises a hierarchy of one or more authentication sub-regions, each sub-region containing at least one location of interest.

18. The method of claim 1 wherein at least one location of interest is subject to a predetermined manufacturing specification, and further comprising comparing the digital fingerprint to the predetermined manufacturing specification to determine a level of compliance of the physical object to the predetermined manufacturing specification.

19. The method of claim 16 and further comprising:
acquiring a digital fingerprint of a target physical object;
querying the conforming object database based on the digital fingerprint of the target physical object; and
based on a response to the query, estimating a level of conformity of the target physical object.

20. The method of claim 16 and further comprising:
analyzing the digital fingerprints forming the conforming object database; and
extracting patterns from the digital fingerprints to create a database of conforming characteristics for objects of the same class.

21. The method of claim 1 further comprising:
processing captured digital image data to form digital fingerprints of a plurality of objects, wherein the digital fingerprints comprise digital fingerprints of a plurality of objects of a given class, which objects of the given class are non-conforming to a predetermined object specification; and
collecting the digital fingerprints to form a machine-readable non-conforming object database for use in comparing potentially non-conforming objects of a same class.

22. The method of claim 21 wherein each digital fingerprint of the digital fingerprints comprises:
data identifying at least one authentication region, the data including a location of the at least one authentication region in an image of the corresponding non-conforming object; and
for each authentication region of the at least one authentication region:
data identifying at least one location of interest in the authentication region; and
for each location of interest of the at least one location of interest, data identifying at least one feature vector that characterizes the location of interest on the corresponding object.

23. The method of claim 22 wherein the at least one authentication region comprises a hierarchy of one or more authentication sub-regions, each sub-region containing at least one location of interest.

24. The method of claim 21 and further comprising:
acquiring a digital fingerprint of a target physical object;
querying the non-conforming object database based on the digital fingerprint of the target physical object; and
based on a response to the query, estimating a level of non-conformity of the target physical object.

25. The method of claim 21 and further comprising:
analyzing the digital fingerprints forming the non-conforming object database; and
extracting patterns from the digital fingerprints to create a database of non-conforming characteristics for objects of the same class.

26. A system comprising:
a manufacturing apparatus to manufacture a physical object;
a digital fingerprint induction machine including a scanner arranged to capture digital image data and a processor operatively coupled to the scanner to process the captured digital image data to form a digital fingerprint; and
an interface, in operable communication with the processor, configured to integrate the induction machine into the manufacturing apparatus to cause the scanner to capture digital image data representing at least a portion of a physical object during or following manufacture of the physical object by the manufacturing apparatus;
wherein the scanner is located within a controlled environment;
the manufacturing apparatus is located within the same controlled environment; and
the processor controls the scanner to capture image data of the portion of the manufactured physical object while the physical object is within the controlled environment so as to so as to ensure that the digital image data captured by the scanner is digital image data of the physical object actually produced by the manufacturing apparatus.

27. The system of claim 26 wherein the processor is arranged to execute stored instructions to carry out the steps of:

selecting at least one authentication region of digital image data captured by the scanner;

analyzing the at least one authentication region of the digital image data captured by the scanner to form a digital fingerprint of the physical object, wherein the digital fingerprint comprises:

for each authentication region of the at least one authentication region:

data identifying the authentication region, the data including a location of the authentication region in the image data;

data identifying at least one location of interest in the authentication region; and for each location of interest of the at least one location of interest, data identifying at least one feature vector that characterizes the location of interest; and data identifying at least one of the induction machine and the manufacturing apparatus; and storing the digital fingerprint in a database.

28. The system of claim 26 wherein the physical object comprises any one of government-issued documents, legal and financial documents, mail pieces, parcels, art, photographs, coins, currency, jewelry, apparel, mechanical parts, consumer goods, electronics, apparel, toys, integrated circuits, weapons, pharmaceuticals, drugs, chemicals, alcohol, tobacco, and food and beverages.

* * * * *